United States Patent
Hayakawa

(10) Patent No.: US 6,333,644 B2
(45) Date of Patent: Dec. 25, 2001

(54) LOGIC CIRCUITS AND CARRY-LOOKAHEAD CIRCUITS

(75) Inventor: Shigeyuki Hayakawa, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/870,687

(22) Filed: Jun. 1, 2001

Related U.S. Application Data

(62) Division of application No. 09/521,620, filed on Mar. 8, 2000.

(30) Foreign Application Priority Data

Mar. 9, 1999 (JP) .................................................. 11-62346
Jun. 30, 1999 (JP) ................................................ 11-186956

(51) Int. Cl.[7] .............................................. A03K 19/096
(52) U.S. Cl. ................................. 326/95; 326/98; 326/93
(58) Field of Search .................................... 326/93–98

(56) References Cited

U.S. PATENT DOCUMENTS 5,638,009 * 6/1997 Sutherland et al. ................... 326/83
6,078,196 * 6/2000 Gayles ................................. 326/121

FOREIGN PATENT DOCUMENTS 9-171455     6/1997  (JP) .

* cited by examiner

*Primary Examiner*—Michael Tokar
*Assistant Examiner*—Anh Tran
(74) *Attorney, Agent, or Firm*—Finnegan, Henderson, Farabow, Garrett & Dunner, L.L.P.

(57) ABSTRACT

Logic circuits and carry-lookahead circuits capable of performing high speed operations with simplified designs are described. The logic circuit is provided for searching a binary bit string from the most significant bit to the least significant bit for a first "0" or "1" bit and comprises a NOT gate circuit receiving the most significant bit of said binary bit string and composed of a dynamic logic circuit; NOR gate circuits provided in a one-to-one correspondence to the respective bits of said binary bit string, each NOR gate circuit receiving the bit of said binary bit string corresponding to the bit position of said each NOR gate circuit and, if any, the bit(s) of said binary bit string which is more significant than the bit corresponding to the bit position of said each NOR gate circuit except for the most significant bit; and two-input NOR gate circuits each of which receives two logic signals as output from adjacent ones of said NOT and NOR gate circuits.

3 Claims, 30 Drawing Sheets

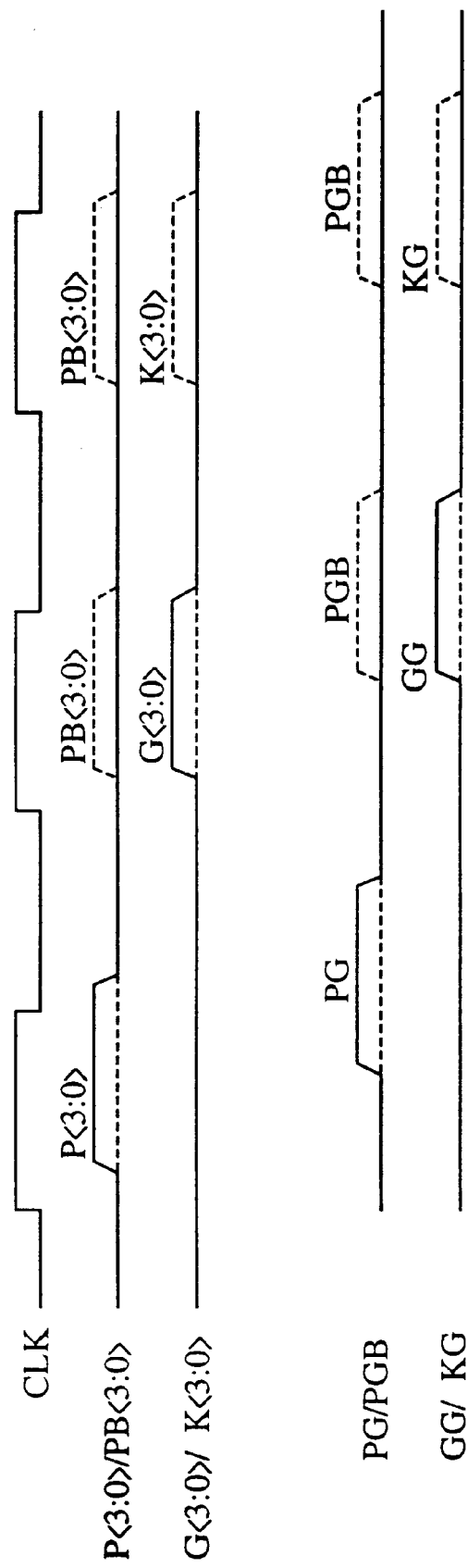

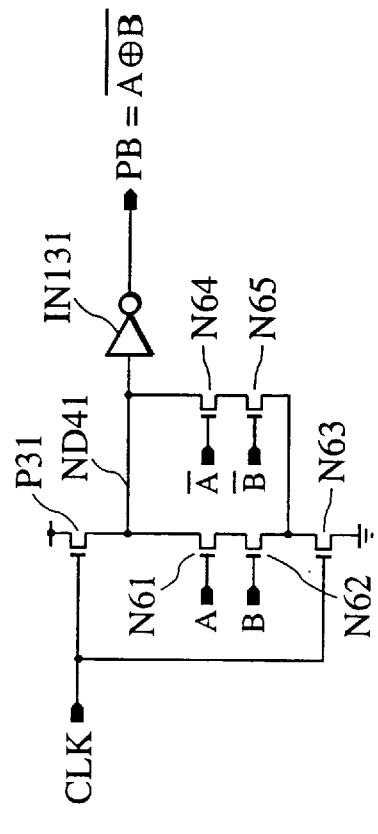
FIG. 21(a)
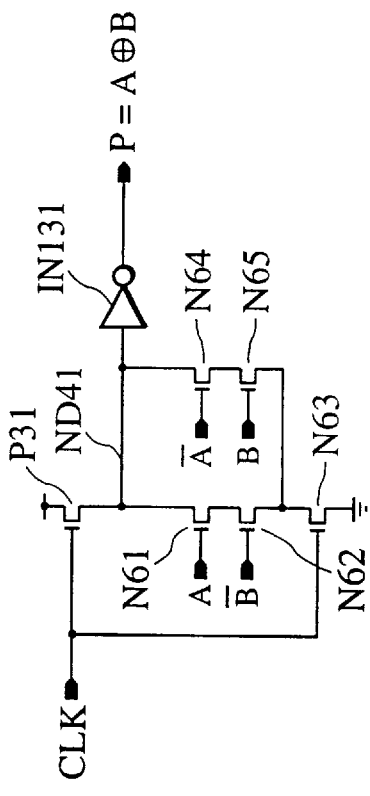
FIG. 21(b)
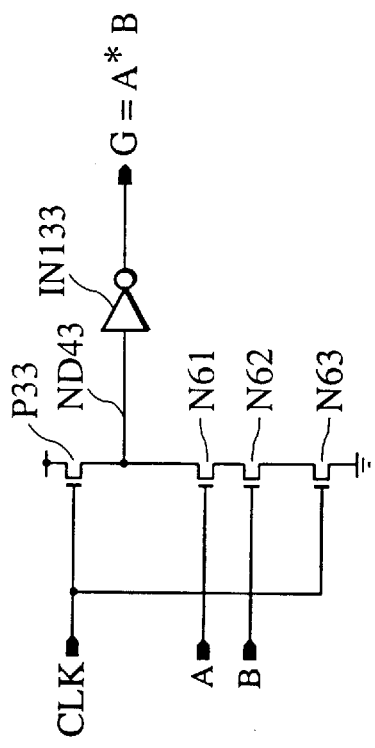
FIG. 21(c)
FIG. 21(d)

000000
LOGIC CIRCUITS AND CARRY-LOOKAHEAD CIRCUITS

CROSS REFERENCE TO RELATED APPLICATIONS

This is a division of application Ser. No. 09/521,620, filed Mar. 8, 2000, which is incoporated herein by reference.

The subject application is related to subject matter disclosed in the Japanese Patent Application No. Hei11-62346 filed in Dec. 14, 1998 in Japan, to which the subject application claims priority under the Paris Convention and which is incorporated by reference herein.

The subject application is also related to subject matter disclosed in the Japanese Patent Application No.Hei11-186956filed in Dec. 14, 1998in Japan, to which the subject application claims priority under the Paris Convention and which is incorporated by reference herein.

BACKGROUND OF THE INVENTION

1. Field of the Invention

The present invention is related to a logic circuit for finding a "0" bit or a "1" bit by searching a binary bit string. Furthermore, the present invention is related to a carry-lookahead (CLA) circuit for use in arithmetic units handling a number of bits.

2. Prior Art

There are utilized logic circuits called a "0" bit searching circuit and a "1" bit searching circuit as logic circuits for constituting the hardware of a computer system. The logic circuits of this kind is used to find a "0" bit or a "1" bit by searching a binary bit string from the most significant bit to the least significant bit. The logic circuits are used to constitute a comparator for determining the largest number among a plurality of numbers, or a priority encoder used in a signal reception circuit having a plurality of input lines and provided, when receiving input signals at two or more input lines, for generating an output signal indicative of the input line receiving an input signal and having the highest priority among from the input lines receiving input signals.

On the other hand, a "1" bit searching circuit in accordance with the prior art is composed of a number of the logic gate connected in a matrix form or in a tree arrangement so that the circuit design tends to be complicated. Furthermore, there are a number of gates arranged from the input to the output so that it takes much time to pass input data therethrough.

On the other hand, carry lookahead circuits have been generally utilized in adder circuits for performing the addition operation of an N-bit input signal a<N-1>, a<N-2>, ..., a<0>), referred to simply as a <N-1:0>, and an N-bit input signal b<N-1>, b<N-2>, ..., b<0>, referred to simply as b<N-1:0>. An example of such a prior art CLA circuit is described in Japanese Patent Published Application No.Hei 3-150630. The prior art carry lookahead circuit as described is a so-called carry select adder which performs the addition operation both in the case that the carry-in signal is "0" and in the case that the carry-in signal is "1". In accordance with the carry out from the lower bit operation, either result of the addition operation is selected and output as a correct result.

There is described a carry lookahead circuit as illustrated in FIG. 2 in Japanese Patent Published Application No.Hei 3-150630. Propagate signals P<3:0> and generate signals G<3:0> are calculated during the addition operation of the input signals a<3:0> and the input signals b<3:0> by obtaining the EX-OR and the AND of each corresponding bits of the input signals a<3:0> and the input signals b<3:0>. The propagate signals P<3:0> and the generate signals G<3:0> are input to the carry lookahead circuit together with the carry-in signal Cin from the lower stage in order to generate carry signals C<3:0>.

FIG. 3 is a block diagram showing an exemplary carry select adder which performs the addition operation both in the case that the carry-in signal is "0" and in the case that the carry-in signal is "1" and, in accordance with the carry out from the lower bit operation, either result of the addition operation is selected and output as a correct result. The carry lookahead circuit CLA1 serves to performs the addition operation in the case that the carry-in signal is "1" while the carry lookahead circuit CLA2 serves to performs the addition operation in the case that the carry-in signal is "0". Either of the outputs of the carry lookahead circuits CLA1 and CLA2 are selected by means of a 2-1 multiplexer MUX.

A bit group 0 is arranged in the form of the 4-bit carry lookahead circuit as illustrated in FIG. 2 in order to handle <0:3> bits of data having a 32 bit length to be handled while seven bit groups 1 to 7 are arranged in the form of the 4-bit carry lookahead circuits each designed as illustrated in FIG. 3 in order to handle <4:7> bits, <8:11> bits, <12:15> bits, ... <28:31> bits of the data. A carry lookahead circuit capable of handling 32 bits is then formed as illustrated in FIG. 1. C<0> to C<3>, C<4> to C<7>, C<8> to C<11>, ..., C<28> to C<31> are sequentially generated in this order in the group 0, the group 1, ... the group 7.

However, there is a following problem in the prior art CLA as described above. FIG. 4 shows the delay time required for completing the calculation, i.e., the delay time required for generating the carry signals C<0> to C<31>. Each of the carry lookahead circuits CLA1 and CLA2 of the respective carry lookahead circuits of the group 0 to the group 7 takes the same time T1 required for calculation. However, the multiplexer MUX of the carry lookahead circuit of the group 1 can initiate the operation required for selecting carry signals only after receiving the carry signal C<3> as given from the group 0. The delay time T2 of the multiplexer MUX is accumulated from the group 1 to the group 7 resulting in the total delay time T1+T2*7. Because of this, in accordance with the prior art technique, there is a problem that a longer delay time is required for completing the calculation of carry signals for data having a longer bit sequence.

SUMMARY OF THE INVENTION

The present invention has been made in order to solve the shortcomings as described above. It is an object of the present invention to provide logic circuits capable of performing high speed operations with simplified designs.

It is another object of the present invention to provide a carry lookahead circuit wherein it is possible to reduce the delay time required for completing the calculation by obtaining group propagate signals, group generate signals and group kill signals for each m bits by the use of the respective propagate signals, generate signals and kill signals respectively for each of m bits.

In brief, the above and other objects and advantages of the present invention are accomplished by a logic circuit for searching a binary bit string from the most significant bit to the least significant bit for a first "0" or "1" bit, said logic circuit comprising:

a NOT gate circuit receiving the most significant bit of said binary bit string and composed of a dynamic logic circuit;

NOR gate circuits provided in a one-to-one correspondence to the respective bits of said binary bit string, each NOR gate circuit receiving the bit of said binary bit string corresponding to the bit position of said each NOR gate circuit and, if any, the bit(s) of said binary bit string which is more significant than the bit corresponding to the bit position of said each NOR gate circuit except for the most significant bit; and two-input NOR gate circuits each of which receives two logic signals as output from adjacent ones of said NOT and NOR gate circuits.

In accordance with a preferred embodiment of the present invention, said NOT and NOR gate circuits are composed of NMOS FETs connected in parallel between the ground level and the output lines of said NOT and NOR gate circuits.

Also, in accordance with a preferred embodiment of the present invention, a plurality of inverters are provided in advance of said 2-input NOR gate circuits.

In accordance with another aspect of the present invention, a logic circuit comprising:

a dynamic logic circuit composed of a first combinational logic circuit connected between an output line and a ground level, said output line of said dynamic logic circuit being pulled up to a "H" level during the precharge period, while said output line is disconnected from said ground level and an electric power source is supplied to said output line, by controlling input signals to the first combinational logic circuit;

said first combinational logic circuit being given input signals to be evaluated during an evaluation period while said output line is disconnected from said electric power source so that said dynamic logic circuit serves to output a logic value corresponding to an logic operation by the use of the input signals;

a pseudo-NMOS circuit composed of a second combinational logic circuit connected between an output line and a ground level, said output line of said pseudo-NMOS circuit being pulled down to a "L" level during the precharge period, while said output line is connected to said ground level, by controlling input signals to the first combinational logic circuit;

said second combinational logic circuit being given input signals to be evaluated while an electric power source is supplied to said output line during an evaluation period so that said pseudo-NMOS circuit serves to output a logic value corresponding to an logic operation by the use of the input signals by selectively disconnecting said output line from said ground level; and a logic gate connected to said dynamic logic circuit and serving to control the supply of the electric power source to said output line of said pseudo-NMOS circuit in accordance with the signal of said output line of said dynamic logic circuit, wherein said dynamic logic circuit and said pseudo-NMOS circuit are complementary and wherein said logic gate serves to cut off the supply of the electric power source to said output line of said pseudo-NMOS circuit, when said output line of said pseudo-NMOS circuit and said ground level are connected during the evaluation period to pull down said output line to the "L" level, in response to the corresponding change of said output line of said dynamic logic circuit.

In accordance with a preferred embodiment of the present invention, said first combinational logic circuit and said second combinational logic circuit have the same arrangement of constituent NMOS FETs.

In accordance with a further aspect of the present invention, a pseudo-NMOS logic circuit comprising:

a first pseudo-NMOS circuit composed of a first combinational logic circuit connected between an output line and a ground level, said output line of said pseudo-NMOS circuit being pulled down to a "L" level during the precharge period, while said output line is connected to said ground level, by controlling input signals to the first combinational logic circuit;

said first combinational logic circuit being given input signals to be evaluated while an electric power source is supplied to said output line during an evaluation period so that said first pseudo-NMOS circuit serves to output a logic value corresponding to an logic operation by the use of the input signals by selectively disconnecting said output line from said ground level; and a second pseudo-NMOS circuit composed of a second combinational logic circuit connected between an output line and a ground level, said output line of said pseudo-NMOS circuit being pulled down to a "L" level during the precharge period, while said output line is connected to said ground level, by controlling input signals to the second combinational logic circuit;

said second combinational logic circuit being given input signals to be evaluated while an electric power source is supplied to said output line during an evaluation period so that said second pseudo-NMOS circuit serves to output a logic value corresponding to an logic operation by the use of the input signals by selectively disconnecting said output line from said ground level; and a first logic gate connected to said second pseudo-NMOS circuit and serving to control the supply of the electric power source to said output line of said first pseudo-NMOS circuit in accordance with the signal of said output line of said second pseudo-NMOS logic circuit, a second logic gate connected to said first pseudo-NMOS circuit and serving to control the supply of the electric power source to said output line of said second pseudo-NMOS circuit in accordance with the signal of said output line of said first pseudo-NMOS logic circuit, wherein said first pseudo-NMOS logic circuit and said second pseudo-NMOS logic circuit are complementary and wherein one of said first logic gate and said second logic gate serves to cut off the supply of the electric power source to said output line of one of said first pseudo-NMOS circuit and said second pseudo-NMOS circuit during the evaluation period in response to the corresponding change of said output line of the other of said first pseudo-NMOS circuit and said second pseudo-NMOS circuit to a "H" level.

In accordance with a still further aspect of the present invention, a carry lookahead circuit for generating a group propagate signal PG and at least one of a group generate signal GG and a group kill signal KG for a group of m bits (m is an integer no less than 1) by the use of propagate signals P, generate signals G and kill signals K respectively for the constituent bits of the group, said carry lookahead circuit comprising:

a logic circuit for outputting a logic value as said group propagate signal PG and/or the inversion of said logic value as the inversion of said group propagate signal PGB when all of said propagate signals P take said logic value or when all of the inversion of the propagate signals PB take the inversion of said logic value;

a priority encoder for searching said propagate signals P and/or the inversion of said propagate signals PB from the most significant bit to the least significant bit for detecting the inversion of said logic value in said propagate signals P and/or for detecting said logic value in the inversion of said propagate signals PB in order to generate selection signals of m bits one of which is activated corresponding to said propagate signal P detected to take the inversion of said logic value and/or corresponding to the inversion of said propagate signal PB detected to take said logic value said priority encoder serving to generate said selection signals of which no bit is activated in order to indicate that there is no bit to be selected, when the inversion of said logic value is not detected in said propagate signals P or when said logic value is not detected in the inversion of said propagate signals PB; and a selector circuit for receiving said selection signals S, selecting one of the generate signals G and/or one of the kill signals K corresponding to the activated bit of said selection signals and outputting said one of the generate signals G and/or said one of the kill signals K as selected as said group generate signal GG and/or said group kill signal KG when there is a bit to be selected of said selection signals, said selector circuit serving to output the inversion of said logic value as said group generate signal GG and/or said group kill signal KG when there is no bit to be selected of said selection signals.

In accordance with a still further aspect of the present invention, a carry lookahead circuit for generating a group propagate signal PG, a group carry signal CG and at least one of a group generate signal GG and a group kill signal KG for a group of m bits (m is an integer no less than 1) by the use of a carry signal C, propagate signals P, generate signals G and kill signals K respectively for the constituent bits of the group, said carry lookahead circuit comprising:

a logic circuit for outputting a logic value as said group propagate signal PG and/or the inversion of said logic value as the inversion of said group propagate signal PGB when all of said propagate signals P take said logic value or when all of the inversion of the propagate signals PB take the inversion of said logic value;

a priority encoder for searching said propagate signals P and/or the inversion of said propagate signals PB from the most significant bit to the least significant bit for detecting the inversion of said logic value in said propagate signals P and/or for detecting said logic value in the inversion of said propagate signals PB in order to generate selection signals of m bits one of which is activated corresponding to said propagate signal P detected to take the inversion of said logic value and/or corresponding to the inversion of said propagate signal PB detected to take said logic value said priority encoder serving to generate said selection signals of which no bit is activated in order to indicate that there is no bit to be selected, when the inversion of said logic value is not detected in said propagate signals P or when said logic value is not detected in the inversion of said propagate signals PB; and a selector circuit for receiving said selection signals S, selecting one of the generate signals G and one of the kill signals K corresponding to the activated bit of said selection signals and outputting said one of the generate signals G and said one of the kill signals K as selected as said group carry signal CG and the inversion of said carry signal CGB when there is a bit to be selected of said selection signals, said selector circuit serving to output said carry signal C as said group carry signal CG responsive to said group propagate signal PG and the inversion of group propagate signal PGB.

In accordance with a still further aspect of the present invention, a carry lookahead circuit comprising:

a plurality of first carry lookahead circuit groups each of which is composed of a plurality of first carry lookahead circuits;

a second carry lookahead circuit group which is composed of a plurality of second carry lookahead circuits each of which is connected to those of said first carry lookahead circuits belonging to respective one of said first carry lookahead circuit groups; and a third carry lookahead circuit connected to said second carry lookahead circuits, wherein each of said first carry lookahead circuits is a carry lookahead circuit for generating a first group propagate signal and at least one of a first group generate signal and a first group kill signal for a group of m bits (m is an integer no less than 1) by the use of propagate signals, generate signals and kill signals respectively for the constituent bits of the group, each of said first carry lookahead circuits comprising:

a logic circuit for outputting a logic value as said first group propagate signal and/or the inversion of said logic value as the inversion of said first group propagate signal when all of said propagate signals take said logic value or when all of the inversion of the propagate signals take the inversion of said logic value;

a priority encoder for searching said propagate signals and/or the inversion of said propagate signals from the most significant bit to the least significant bit for detecting the inversion of said logic value in said propagate signals and/or for detecting said logic value in the inversion of said propagate signals in order to generate selection signals of m bits one of which is activated corresponding to said propagate signal detected to take the inversion of said logic value and/or corresponding to the inversion of said propagate signal detected to take said logic value said priority encoder serving to generate said selection signals of which no bit is activated in order to indicate that there is no bit to be selected, when the inversion of said logic value is not detected in said propagate signals or when said logic value is not detected in the inversion of said propagate signals; and a selector circuit for receiving said selection signals S, selecting one of the generate signals and/or one of the kill signals corresponding to the activated bit of said selection signals and outputting said one of the generate signals and/or said one of the kill signals as selected as said first group generate signal and/or said first group kill signal when there is a bit to be selected of said selection signals, said selector circuit serving to output the inversion of said logic value as said first group generate signal and/or said first group kill signal when there is no bit to be selected of said selection signals, wherein each of said second carry lookahead circuits is a carry lookahead circuit for generating a second group propagate signal and at least one of a second group generate signal and a second group kill signal for a corresponding first carry lookahead circuit group by the use of said first group propagate signals, said first group generate signals and said first group kill signals respectively output from the constituent carry lookahead circuits of said corresponding first carry lookahead circuit group, each of said second carry lookahead circuits comprising:

a logic circuit for outputting said logic value as said second group propagate signal and/or the inversion of said logic value as the inversion of said second group propagate signal when all of said first group propagate signals take said logic value or when all of the inversion of the first group propagate signals take the inversion of said logic value;

a priority encoder for searching said first group propagate signals and/or the inversion of said first group propagate signals from the most significant bit to the least significant bit for detecting the inversion of said logic value in said first group propagate signals and/or for detecting said logic value in the inversion of said first group propagate signals in order to generate selection signals of a plurality of bits one of which is activated corresponding to said first group propagate signal detected to take the inversion of said logic value and/or corresponding to the inversion of said first group propagate signal detected to take said logic value said priority encoder serving to generate said selection signals of which no bit is activated in order to indicate that there is no bit to be selected, when the inversion of said logic value is not detected in said first group propagate signals or when said logic value is not detected in the inversion of said first group propagate signals; and a selector circuit for receiving said selection signals S, selecting one of the first group generate signals and/or one of the first group kill signals corresponding to the activated bit of said selection signals and outputting said one of the first group generate signals and/or said one of the first group kill signals as selected as said second group generate signal and/or said second group kill signal when there is a bit to be selected of said selection signals, said selector circuit serving to output the inversion of said logic value as said second group generate signal and/or said second group kill signal when there is no bit to be selected of said selection signals.

wherein each of said third carry lookahead circuits is a carry lookahead circuit for generating a third group propagate signal, a group carry signal and at least one of a third group generate signal and a third group kill signal for a corresponding first carry lookahead circuit group by the use of a carry signal, said second group propagate signals, said second group generate signals and said second group kill signals respectively output from the constituent carry lookahead circuits of said corresponding second carry lookahead circuit group, each of said third carry lookahead circuits comprising:

a logic circuit for outputting a logic value as said third group propagate signal and/or the inversion of said logic value as the inversion of said third group propagate signal when all of said second group propagate signals take said logic value or when all of the inversion of the second group propagate signals take the inversion of said logic value;

a priority encoder for searching said second group propagate signals and/or the inversion of said second group propagate signals from the most significant bit to the least significant bit for detecting the inversion of said logic value in said second group propagate signals and/or for detecting said logic value in the inversion of said second group propagate signals in order to generate selection signals of a plurality of bits one of which is activated corresponding to said second group propagate signal detected to take the inversion of said logic value and/or corresponding to the inversion of said second group propagate signal detected to take said logic value said priority encoder serving to generate said selection signals of which no bit is activated in order to indicate that there is no bit to be selected, when the inversion of said logic value is not detected in said second group propagate signals or when said logic value is not detected in the inversion of said second group propagate signals; and a selector circuit for receiving said selection signals S, selecting one of the second group generate signals and one of the second group kill signals corresponding to the activated bit of said selection signals and outputting said one of the second group generate signals and said one of the second group kill signals as selected as said group carry signal and the inversion of said carry signal when there is a bit to be selected of said selection signals, said selector circuit serving to output said carry signal as said group carry signal responsive to said third group propagate signal and the inversion of said third group propagate signal.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 16 shows a timing chart for explaining the input/output operation of the carry lookahead circuit as illustrated in FIG. 12.

FIG. 21(a) shows a logic circuit for inputting an input signal A and an input signal B and the inversions of the input signal A and the input signal B and outputting the logic sum of the input signal A and the input signal B.

FIG. 21(b) shows a logic circuit for inputting an input signal A and an input signal B and the inversions of the input signal A and the input signal B and outputting the inversion of the logic sum of the input signal A and the input signal B.

FIG. 21(c) and (d) show logic circuits.

DETAILED DESCRIPTION OF EMBODIMENTS

Hereinbelow, several preferred embodiments in accordance with the present invention will be explained in conjunction with the accompanied drawings.

Figure 5:
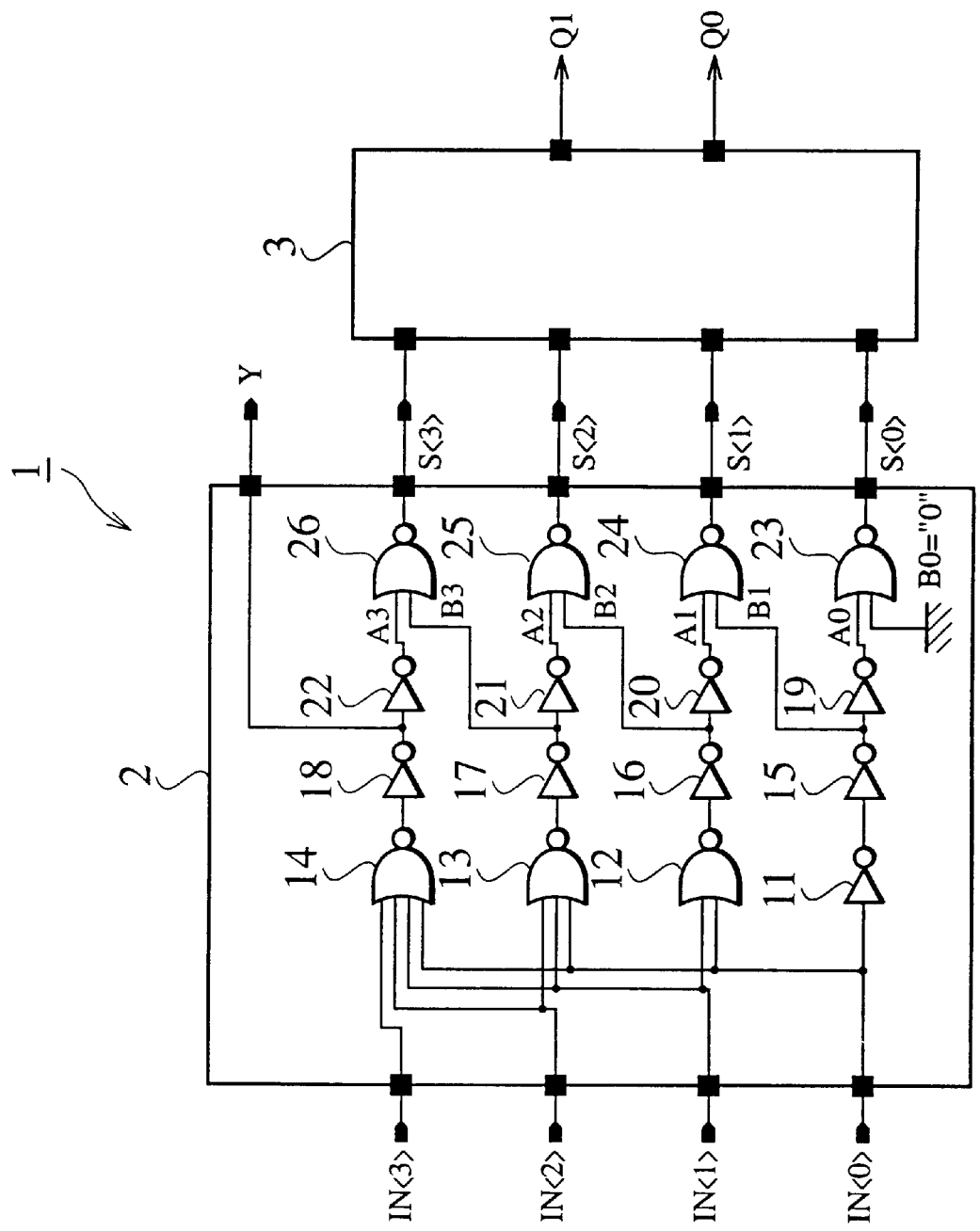
FIG. 5 is a circuit diagram showing a priority encoder receiving a 4 bit signal to which the present invention is applied.

FIG. 5 is a circuit diagram showing a priority encoder receiving a 4 bit signal to which the present invention is applied. The priority encoder 1 is provided for receiving input data of 4 bits each corresponding to different one of four input lines IN<0>, IN<1>, IN<2> and IN<3> and for outputting a 2 bits output code indicative of the input line having the highest priority among the four input lines. The priority encoder 1 is composed of a "1" bit searching circuit 2 accompanied with an encoder 3 for encoding the output signals S<0>, S<1>, S<2> and S<3> of the "1" bit searching circuit 2 into the 2 bits output code as output data Q0 and Q1. In this case, the input line having a smaller index has a higher priority. For example, the priority level of the input line IN<0> is higher than that of the input line IN<1>.

Next, the configuration of the "1" bit searching circuit 2 will be explained. Meanwhile, any conventional encoder can be used as an encoder 3 so that detailed explanation is dispensed with.

The "1" bit searching circuit 2 serves to search a first "1" bit through the input data IN<0>, IN<1>, IN<2> and IN<3> in the priority order, i.e, from IN<0> to IN<3>. When a "1" bit has been found of IN<i> ($0 \leq i \leq 3$) for the first time through the searching process, the "1" bit searching circuit 2 outputs a "1" bit as a Y output signal and the output data S<0>, S<1>, S<2> and S<3> in which a single bit S<i> ($0 \leq i \leq 3$) is "1" while the remaining bits S<j> ($j \neq i$) are "0". Meanwhile, if all the bits of IN<i> ($0 \leq i \leq 3$) are "0", the "1" bit searching circuit 2 outputs a "0" bit as the Y output signal and the output data S<0>, S<1>, S<2> and S<3> of which all bits are "1".

The "1" bit searching circuit 2 as illustrated in FIG. 5 is composed of a NOT gate circuit 11 for receiving the input data IN<0>, a two-input NOT gate circuit 12 for receiving the input data IN<0> and IN<1>, a three-input NOT gate circuit 13 for receiving the input data IN<0>, IN<1> and IN<2> and a four-input NOT gate circuit 14 for receiving the input data IN<0>, IN<1>, IN<2> and IN<3>.

The output signals of the NOT gate circuit 11 and the NOR gate circuits 12 to 14 are inverted by means of subsequent NOT gate circuits 15 to 18 and inverted again by means of NOT gate circuits 19 to 22, and then input to the input lines A0 to A3 of two-input NOR gate circuits 23 to 26. Furthermore, at the same time, the input line B0 of the NOR gate circuit 23 is arranged to receive a bit signal of "0"; the input line B1 of the NOR gate circuit 24 is arranged to receive the inversion signal of the NOT gate circuit 15; the input line B2 of the NOR gate circuit 25 is arranged to receive the inversion signal of the NOT gate circuit 16; and the input line B3 of the NOR gate circuit 26 is arranged to receive the inversion signal of the NOT gate circuit 17. The result of the operation of the NOR gate circuits 23 to 26 is output as the output data S<0>, S<1>, S<2> and S<3>. Furthermore, the signal as inverted by means of the NOT gate circuit 18 is output as the output data Y.

For example, when the input data IN<3:1> of "0101" is input to the "1" bit searching circuit 2 as illustrated in FIG. 5, the bit sequence in the output side of the NOT gate circuit 11 and the NOR gate circuits 12 to 14 is "1000" while the bit sequence in the output side of the subsequent NOT gate circuits 15 to 18 is "0111". The operation of the "1" bit searching circuit 2 is conducted to search a binary bit string of the input data from the most significant bit to the least significant bit for finding a first "1" bit, i.e., a first bit pair of "01", followed by resetting all the subsequent bits to be "1". Accordingly, in the case of IN<3:0>="0101" for example, all the subsequent bits after IN<2> are reset as "0111". Thereafter, the "1" bit searching circuit 2 outputs the output data S<0>, S<1>, S<2> and S<3> as "0100" by passing the data through the NOT gate circuits 19 to 22 and the NOR gate circuits 23 to 26.

The "1" bit searching circuit outputs "1000", "0010" and "0001" in response to the input data "1XXX", "001X" and "0001" respectively, where X is either "0" or "1". On the other hand, the "1" bit searching circuit 2 serves to output a "1" bit as the output data Y if the input data IN<3:0> include a "1" bit.

On the other hand, when the input data IN<3:0> of "0000" is input, the bit sequence in the output side of the NOT gate circuit 11 and the NOR gate circuits 12 to 14 is "1111" while the bit sequence in the output side of the subsequent NOT gate circuits 15 to 18 is "0000". The bit sequence of the output data S<3:0> passed through the NOR gate circuit 23 becomes "0000" because there is no "1" bit in the input data. Furthermore, in the case that there is no "1" bit in the input data IN<3:0>, the "1" bit searching circuit 2 serves to output a "0" bit as the output data Y.

The output data S<3:0> is inputted to the encoder 3 and encoded into a 2 bits output code Q0 and Q1. Meanwhile, the encoder 3 serves to output "00" indicative of the input line IN<0> for the output data S<3:0> of "1000", "01" indicative of the input line IN<1> for the output data S<3:0> of "0100", "10" indicative of the input line IN<2> for the output data S<3:0> of "0010", and "11" indicative of the input line IN<3> for the output data S<3:0> of "0001". Also, if the "1" bit searching circuit outputs a "0" bit as the output data Y, the output data S<3:0> is assumed to be "0000" irrespective qf the actual output of the encoder 3.

The "1" bit searching circuit in accordance with this embodiment of the present invention can be designed in a simply fashion as compared with a "1" bit searching circuit in accordance with the prior art technique which is composed of a number of the logic gates connected in a matrix form or in a tree arrangement. Furthermore, there are fewer gates arranged one after another from the input to the output so that it takes a short time to pass input data therethrough. Accordingly, it is possible to realize logic circuits capable of performing high speed operations with simplified designs.

While the logic circuit in accordance with this embodiment of the present invention has been explained as a "1" bit searching circuit, it will be easily understood to those skilled in the art that a "0" bit searching circuit can be designed in the same manner.

Next, the "1" bit searching circuit in accordance with this embodiment of the present invention will be more specifically explained.

Figure 6:
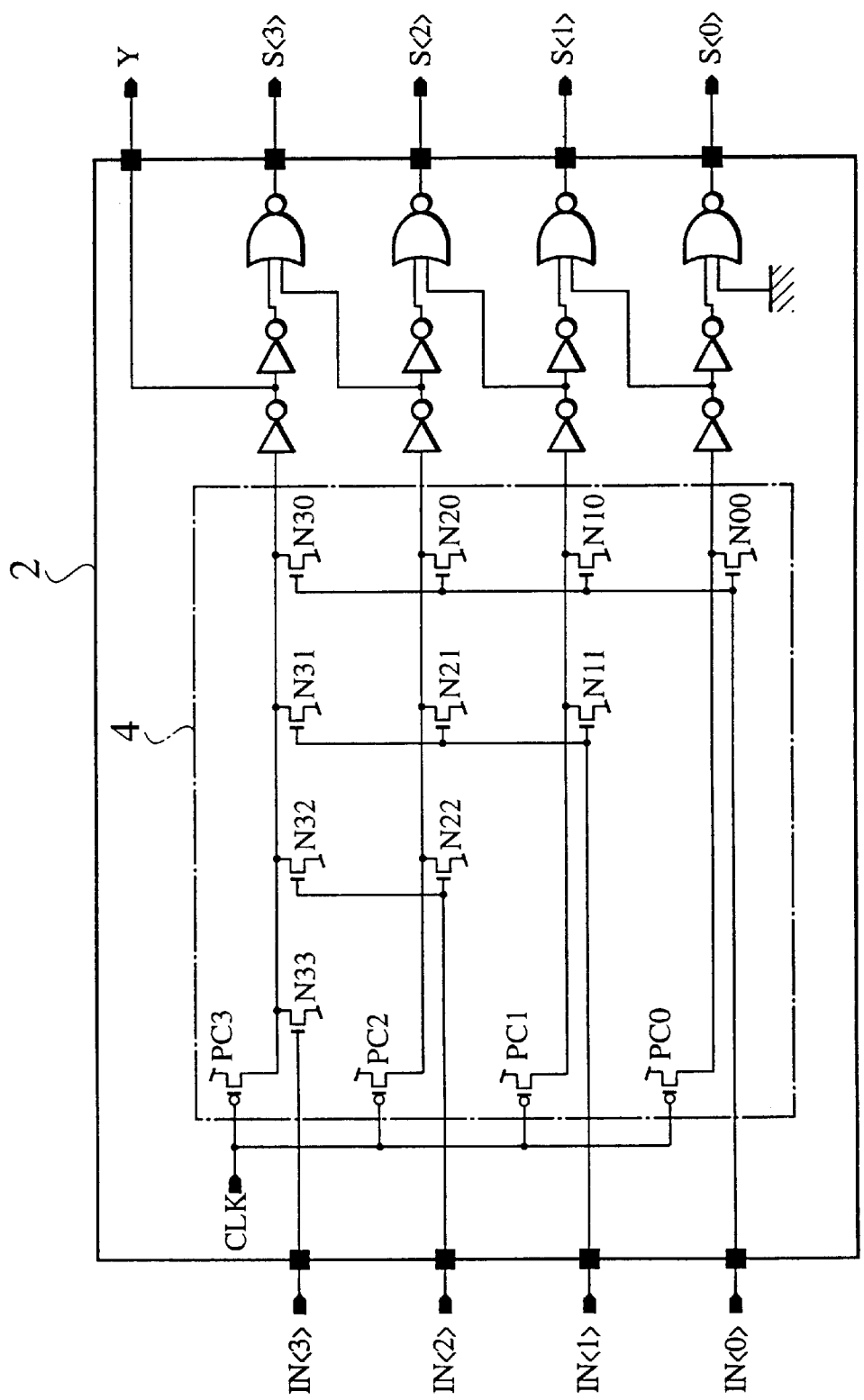
FIG. 6 is a circuit diagram showing the "1" bit searching circuit as illustrated in FIG. 5 in which the NOT gate circuit 11 and the NOR gate circuits 12 to 14 are composed of a dynamic logic circuit.

FIG. 6 is a circuit diagram showing the "1" bit searching circuit 2 as illustrated in FIG. 5 in which the NOT gate circuit 11 and the NOR gate circuits 12 to 14 are composed of a dynamic logic circuit as enclosed with a broken line. In the same figure, the references PC0 to PC3 desingate PMOS FETs controlled by a clock signal (CLK) while the references N00 to N33 desingate NMOS FETs. Comparing FIG. 6 to FIG. 5, the NMOS FET N00 corresponds to the NOT gate circuit 11; the NMOS FETs N10 and N11 correspond to the two-input NOR gate circuit 12; the NMOS FETs N20 to N22 correspond to the three-input NOR gate circuit 13; and the NMOS FETs N30 to N33 correspond to the four-input NOR gate circuit 14.

Figure 7:
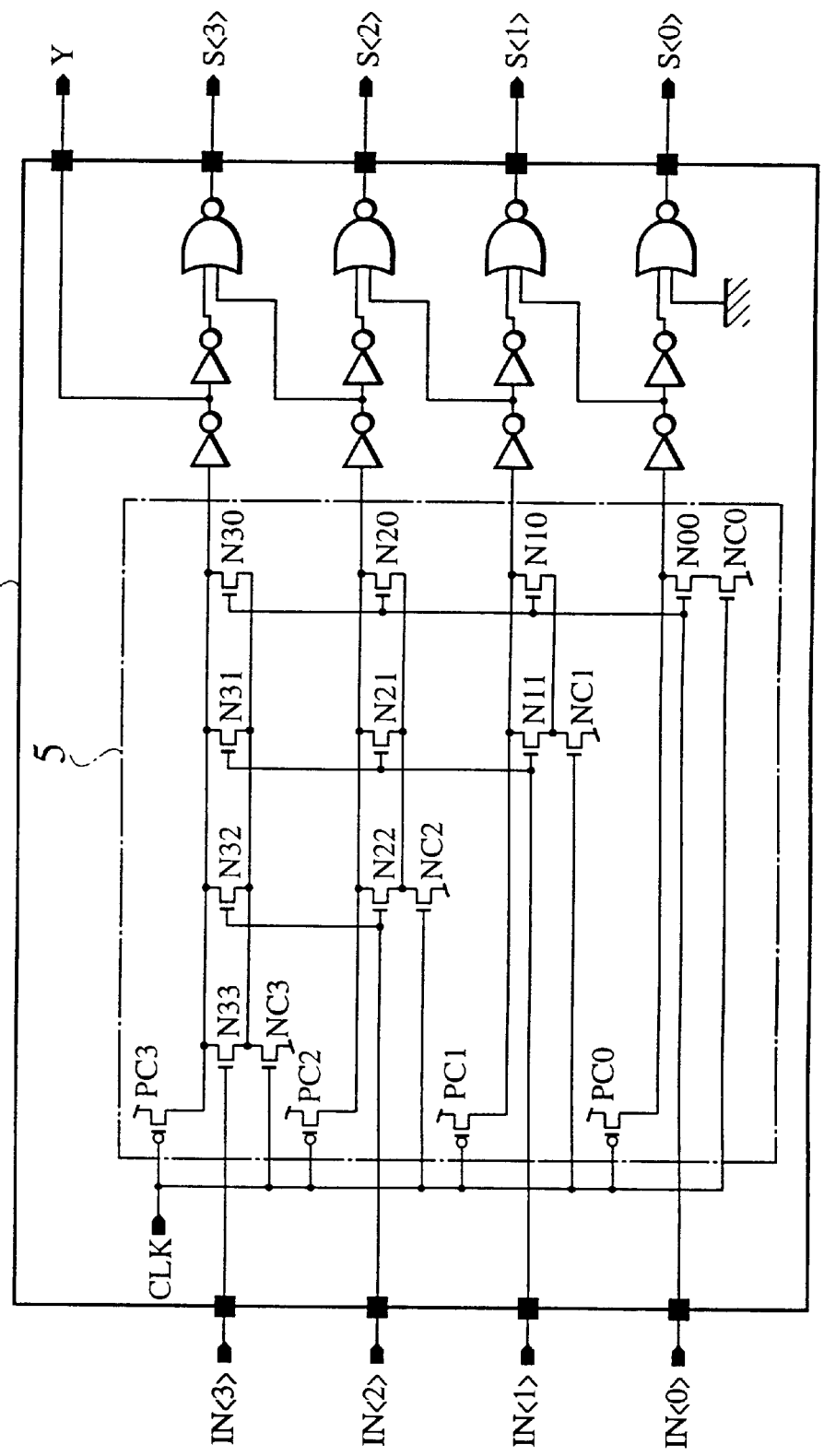
FIG. 7 is a circuit diagram showing the "1" bit searching circuit 2 in which NMOS FETs NC0 to NC3 are inserted to the dynamic logic circuit as illustrated in FIG. 6 and enclosed with a broken line in order to dynamically enable the dynamic logic circuit in synchronism with the clock signal.

FIG. 7 is a circuit diagram showing the "1" bit searching circuit 2 in which NMOS FETs NC0 to NC3 are inserted to the dynamic logic circuit as illustrated in FIG. 6 and enclosed with,a broken line in order to dynamically enable the dynamic logic circuit in synchronism with the clock signal. In the case of the dynamic logic circuit 5 as illustrated in FIG. 7, while the operation speed becomes slightly lower than in the case of the dynamic logic circuit as illustrated in FIG. 6 and enclosed with a broken line, it is possible to prevent undesirable current from passing through the logic circuit during the precharging cycle responsive to the clock signal.

Figure 8:
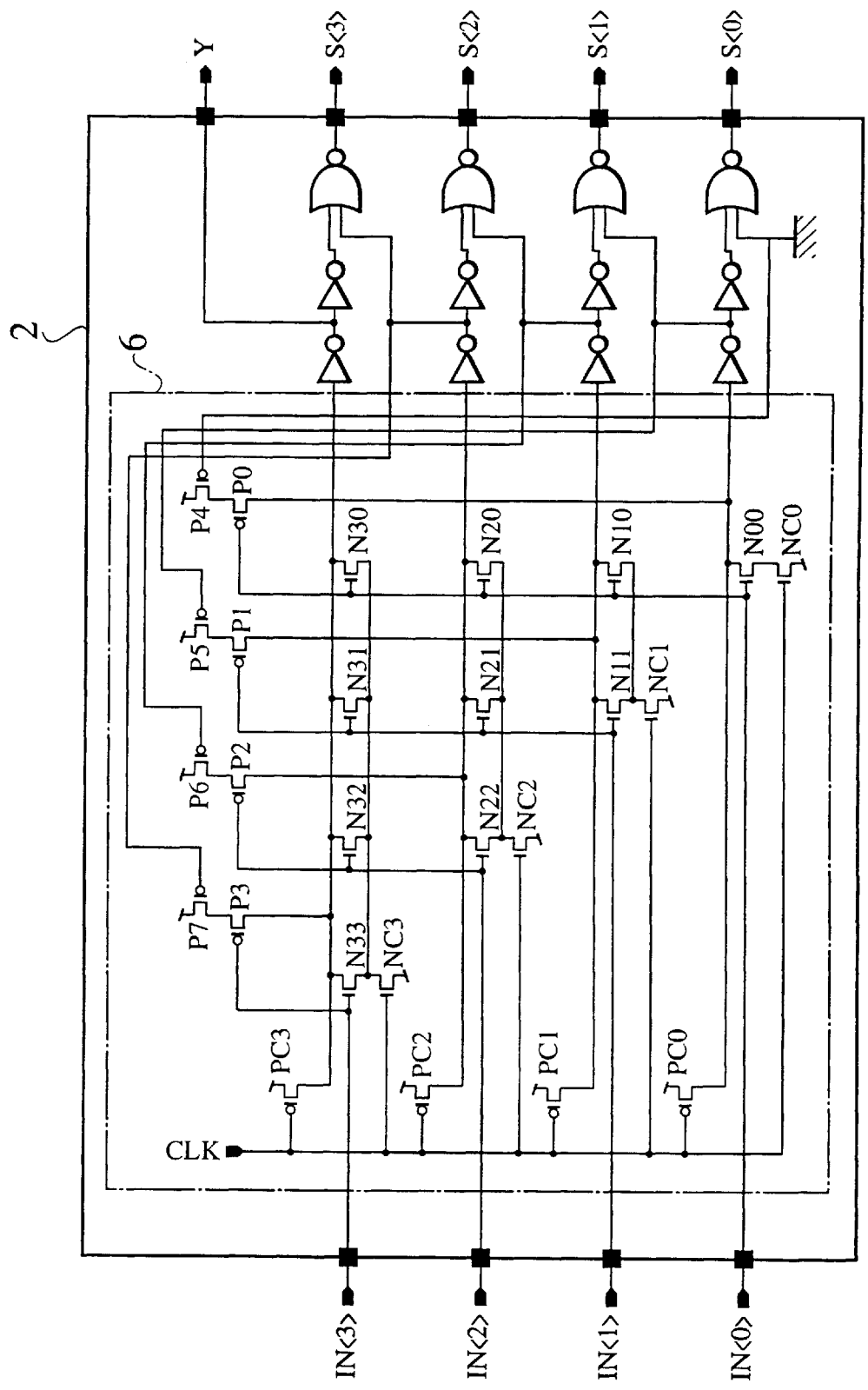
FIG. 8 is a circuit diagram showing the "1" bit searching circuit 2 in which a static circuit P0 to P7 are added to the dynamic logic circuit 5 as illustrated in FIG. 7 in order to statically operate the dynamic logic circuit as enclosed with a broken line in synchronism with the clock signal.

FIG. 8 is a circuit diagram showing the "1" bit searching circuit 2 in which a static circuit P0 to P7 are added to the dynamic logic circuit 5 as illustrated in FIG. 7 in order to statically operate the dynamic logic circuit as enclosed with a broken line in synchronism with the clock signal. Generally speaking, it is difficult to maintain a "H" level as precharged by a dynamic logic circuit. However, in the case of the dynamic logic circuit 6 as illustrated in FIG. 8, the logic of the circuit is statically determined so that it is possible to stabilize the operation of the logic circuit. Meanwhile, the operation speed of the logic circuit as illustrated in FIG. 8 can be improved comparable to the operation speed of the logic circuit as illustrated in FIG. 6.

Figure 9:
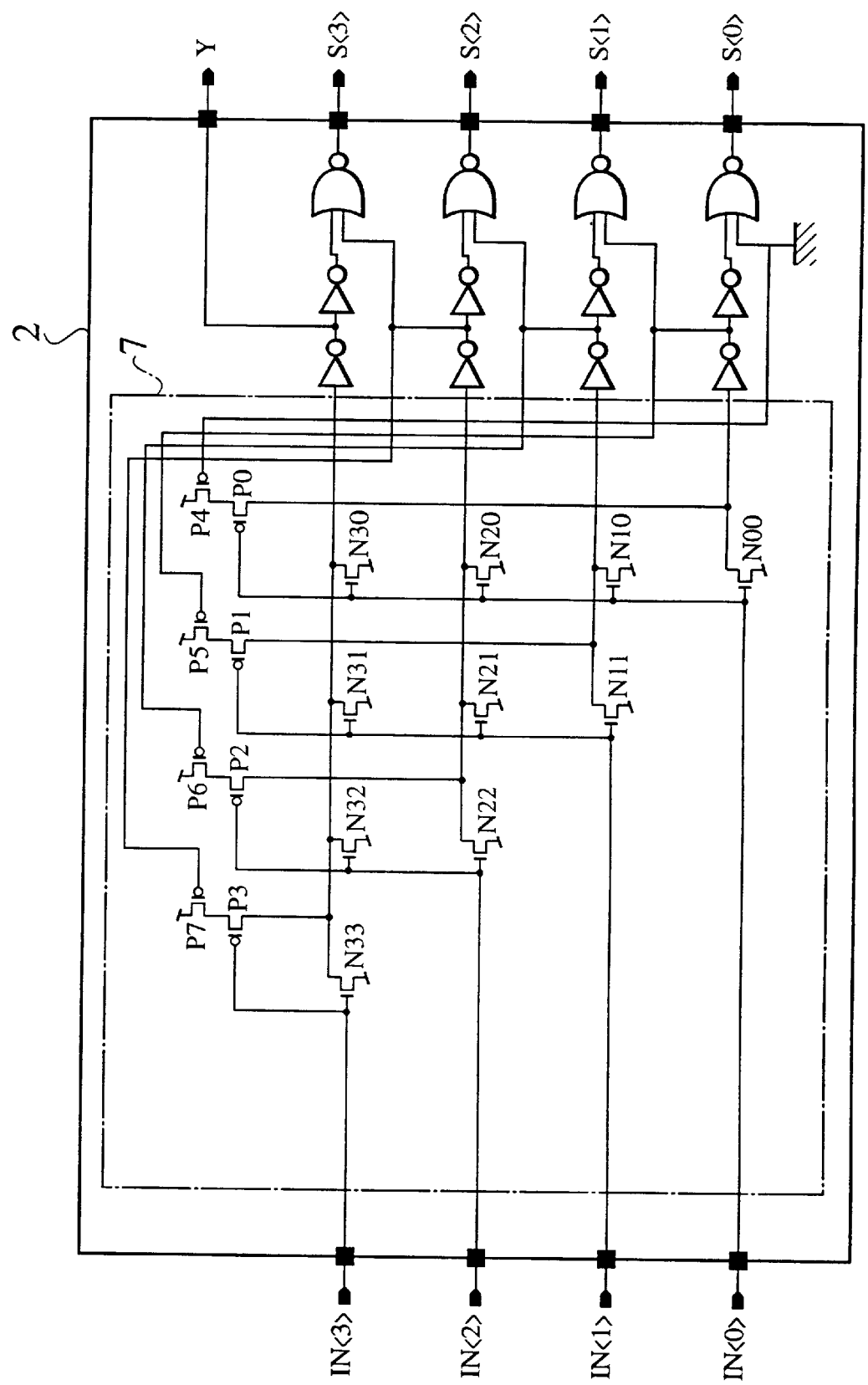
FIG. 9 is a circuit diagram showing the "1" bit searching circuit 2 in which a static circuit P0 to P7 are added to the dynamic logic circuit 5 as illustrated in FIG. 7 in order to statically operate the dynamic logic circuit as enclosed with a broken line and in which the clocked circuitry is eliminated.

FIG. 9 is a circuit diagram showing the "1" bit searching circuit 2 in which a static circuit P0 to P7 are added to the dynamic logic circuit 5 as illustrated in FIG. 7 in order to statically operate the dynamic logic circuit as enclosed with a broken line and in which the clocked circuitry is eliminated. In the case of the dynamic logic circuit 7 as illustrated in FIG. 9, the logic of the circuit is statically determined so that it is possible to stabilize the operation of the logic circuit. Meanwhile, the operation speed of the logic circuit as illustrated in FIG. 9 can also be improved comparable to the operation speed of the logic circuit as illustrated in FIG. 6 in the same manner.

Figure 10:
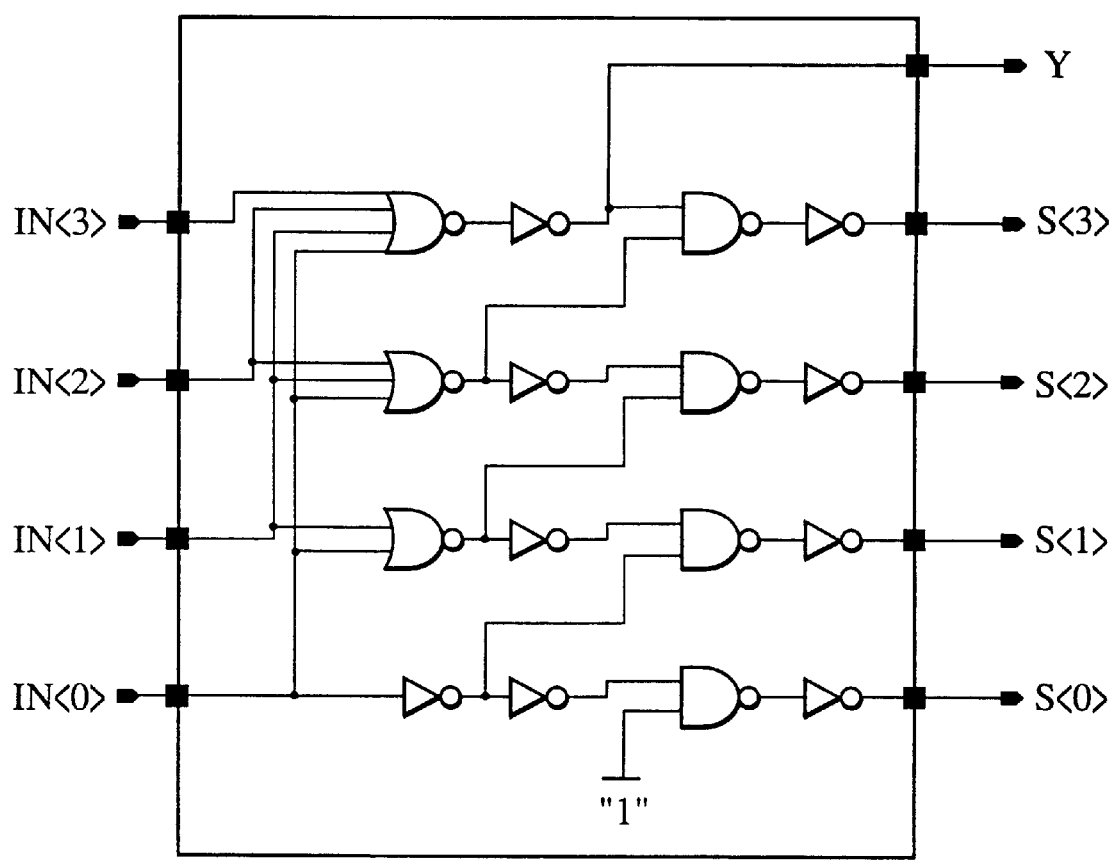
FIG. 10 is a circuit diagram showing the "1" bit searching circuit as illustrated in FIG. 5 by the use of NAND gate circuits.

While the logic circuit in accordance with this embodiment of the present invention has been explained with the "1" bit searching circuit 2 as composed of the NOR gate circuits and the NOT gate circuits, it is possible to design the "1" bit searching circuit 2 with the NAND gate circuits as illustrated in FIG. 10.

Figure 11:
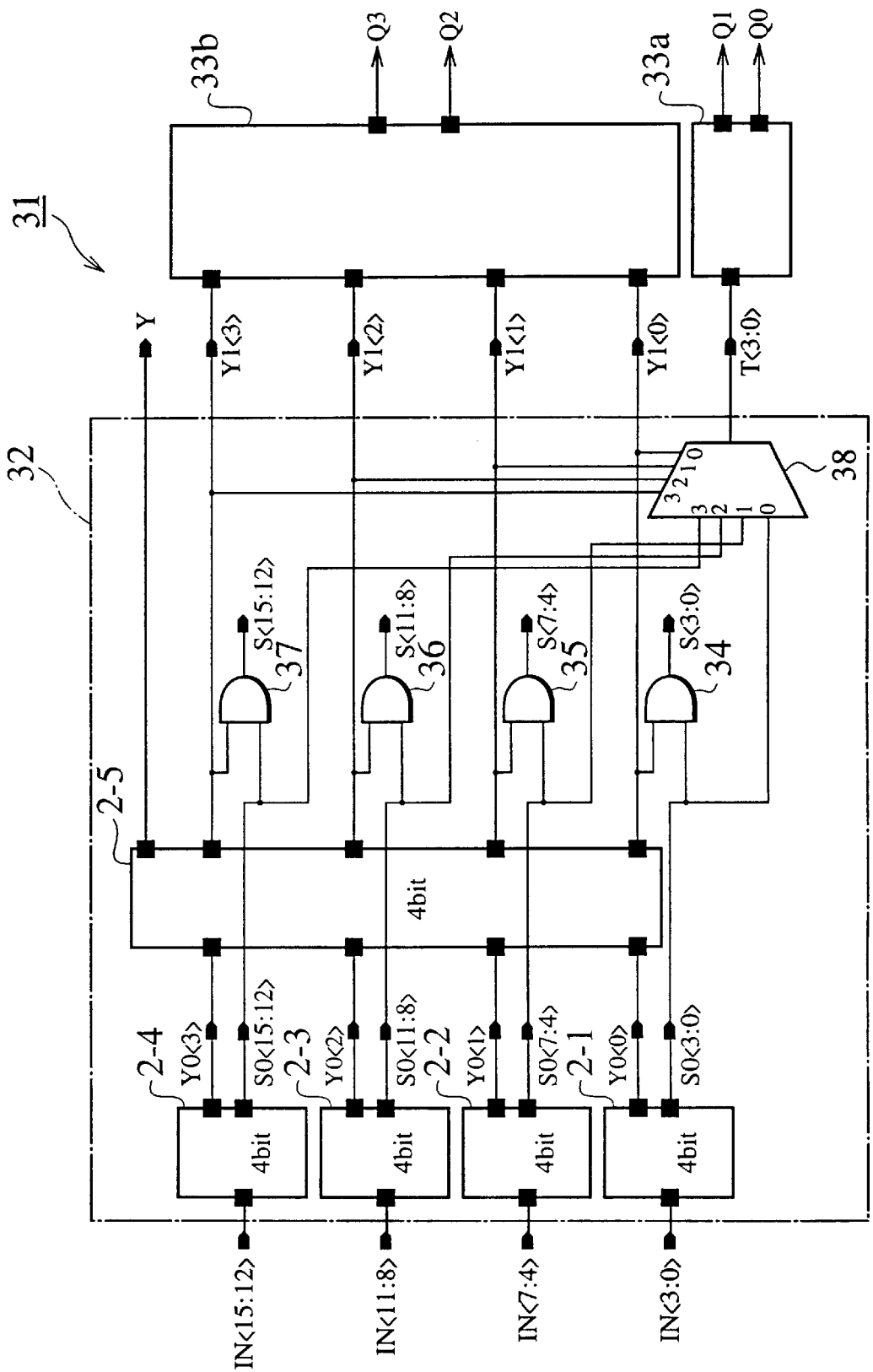
FIG. 11 is a circuit diagram showing a priority encoder receiving an input signal composed of a larger number of bits in accordance with the present invention by making use of a plurality of logic circuits having the same structure as the "1" bit searching circuit as illustrated in FIG. 5.

FIG. 11 is a circuit diagram showing a priority encoder receiving an Input signal composed of a larger number of bits in accordance with the present invention by making use of a plurality of logic circuits having the same structure as the "1" bit searching circuit as illustrated in FIG. 5. The priority encoder 31 is composed of a "1" bit searching circuit 32 and encoders 33a and 33b for encoding the output of the "1" bit searching circuit 32.

Next, the configuration of the "1" bit searching circuit 32 as illustrated in FIG. 11 will be explained.

The "1" bit searching circuit 32 is composed of four "1" bit searching circuits 2-1 to 2-4 capable of receiving 4-bit input data respectively, a "1" bit searching circuit 2-5 also capable of receiving 4-bit input data, an AND gate circuit 34 to 37 and a multiplexer 38.

The "1" bit searching circuits 2-1 to 2-4 are provided in parallel, each of which serves to receive respective four bits of a 16-bit input data IN<15:0>. The "1" bit searching circuits 2-1 to 2-4 serve to generate Y0<3:0> and SO<15:0> as intermediate output signals. The intermediate output signals Y0<3:0> is input to the "1" bit searching circuit 2-5 while the intermediate output signals SO<15:0> are input to ones of the input lines of the AND gate circuits 34 to 37 and the input lines of the multiplexer 38. On the other hand, the "1" bit searching circuit 2-5 serves to generate an output data Y and intermediate output signals Y1<3:0>. The intermediate output signals Y1<3:0> are then input to the others of the input lines of the AND gate circuits 34 to 37 and the selection signal line of the multiplexer 38. For example, the AND gate circuit serves to output the signals SO<11:8> when the intermediate output signal Y<2> is "1" and output the signals of "0000" when the intermediate output signal Y<2> is "0".

The multiplexer 38 serves to select output data SO<i+3:i> (i=0, 4, 8 or 12) of one of the "1" bit searching circuits 2-1 to 2-4 in accordance with the intermediate output signals Y1<3:0> on the selection signal line. Meanwhile, the output data S<15:0> is input to an 16-bit encoder not shown in the figure.

In this structure as described above, the output data S<15:0> and the output Y1<3:0> are equivalent to the logic circuit corresponding to the "1" bit searching circuit 2 illustrated in FIG. 5 as extended to a 16 bit structure.

On the other hand, the intermediate output signals T<3:0> are encoded by means of the encoder 33b in order to generate encoded output signals Q2 and Q3 while the intermediate output signals Y1<3:0> are encoded by means of the encoder 33a in order to generate encoded output signals Q0 and Q1. The signals Q0, Q1, Q2 and Q3 are indicative of the position of a first "1" bit.

For example, if the input data IN<15:0> is composed of a bit sequence of "0000001XXXXXXXXX", the intermediate output signals Y1<3:0> is encoded to "01" as encoded output signals Q2 and Q3 while the intermediate output signals T<3:0> is encoded to "10" as encoded output signals Q0 and Q1. The signals Q0, Q1, Q2 and Q3 are then indicative of the position "6" of a first "1" bit having the highest priority. Also, if the "1" bit searching circuit 2-5 outputs a "0" bit as the output data Y, the output data S<15:0> is assumed to be "0000000000000000" irrespective of the other output signals.

While the output data S<15:0>, the intermediate output signal T<3:0> and the intermediate output signal Y1<3:0> in the case of the logic circuit as illustrated in FIG. 11, it will be the case, depending upon the actual case, that the logic circuit is designed to generate only the output data S<15:0> or generate only the intermediate output signal T<3:0>, and the intermediate output signal Y1<3:0>.

It is therefore possible to realize a logic circuit capable of performing high speed operations even with a number of bits to be handled by means of a simplified circuit design by making use of a plurality of the "1" bit searching circuits as illustrated in FIG. 5 arranged in parallel.

Figure 12:
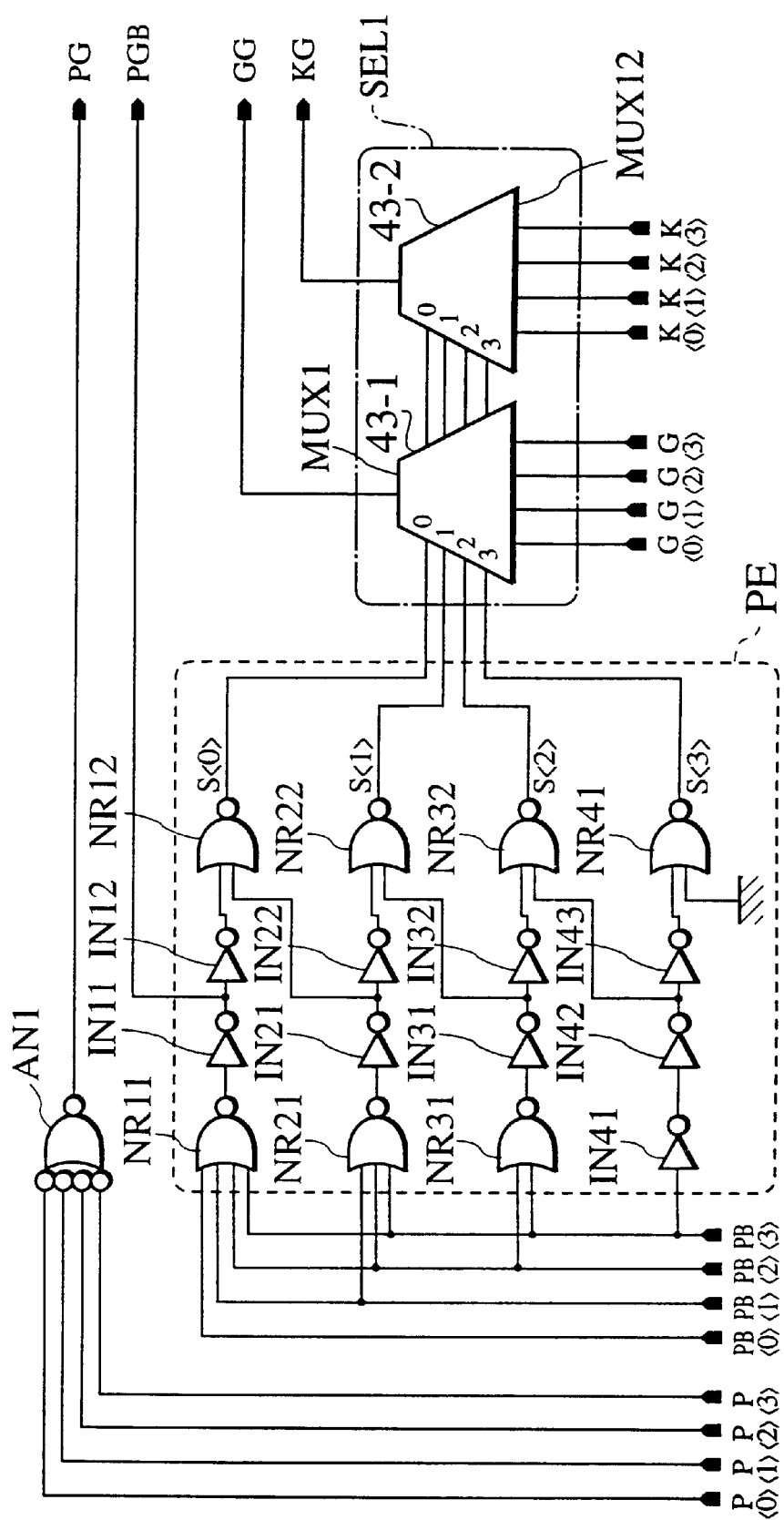
FIG. 12 is a circuit diagram showing a carry lookahead circuit for use in a block adder circuit implemented with the "1" bit searching circuit as illustrated in FIG. 5.

FIG. 12 is a circuit diagram showing a carry lookahead circuit for use in a block adder circuit implemented with the "1" bit searching circuit as illustrated in FIG. 5. Since the 4-1 encoder is not used here so that only the "1" bit searching circuit is utilized. The carry lookahead circuit is provided for receiving P (Propagate), G (Generate) and K (Kill) signals as input to the respective bits of the bit group to be handled by the carry lookahead circuit and calculating therefrom PG, PGB, GG and KG signals of the group. The carry lookahead circuit is composed of a 4-bit pseudo-NMOS NAND gate circuit 41, a 4-bit priority encoder PE and a 4-1 selector circuit SEL1.

The pseudo-NMOS NAND gate circuit AN1 serves to calculate the PG (Propagate of Group) signal of the group on the basis of the P signals as input to the respective bits of the group.

Figure 14:
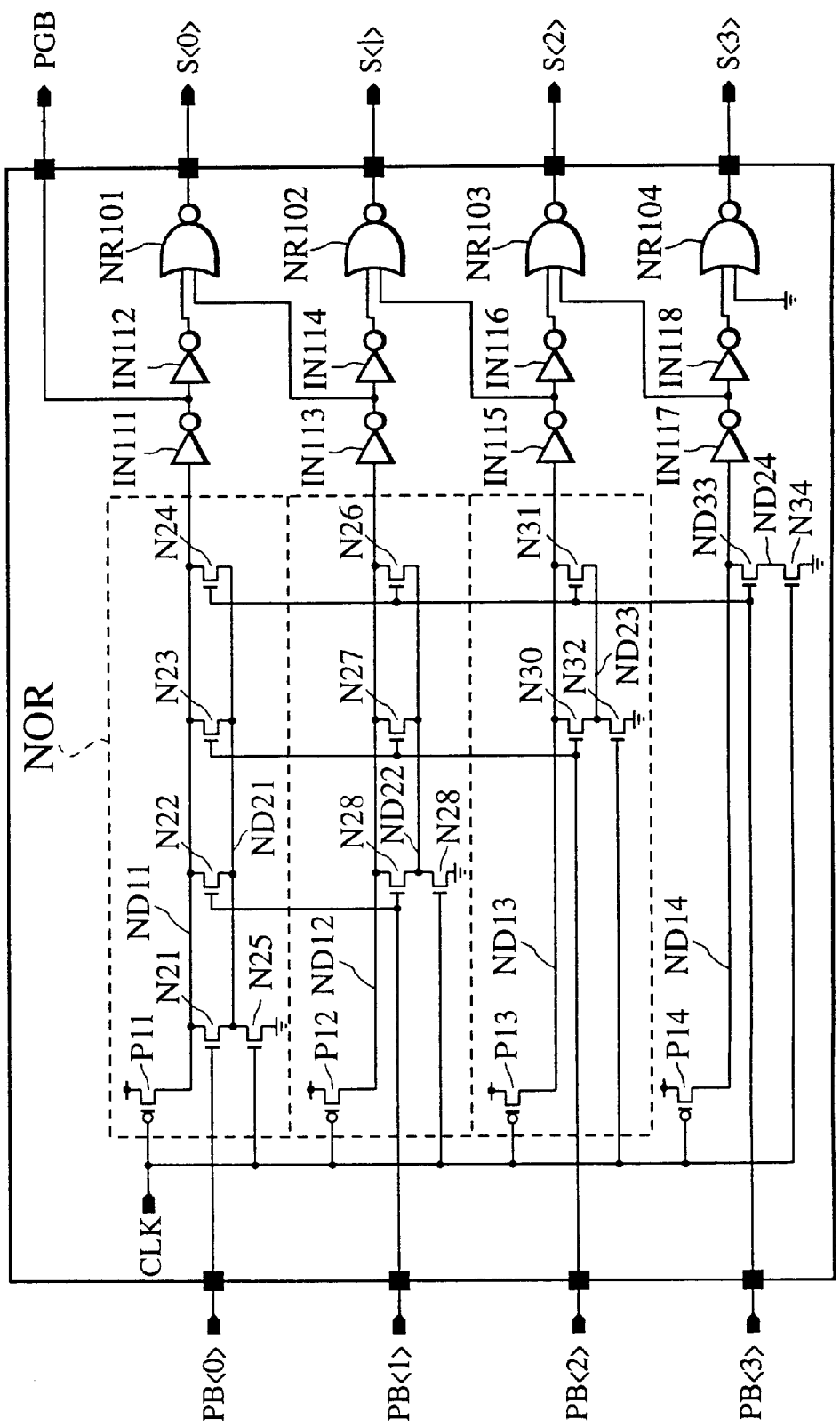
FIG. 14 is a circuit diagram showing the priority encoder PE in which the constituent NOR gate circuits NR11, NR21 and NR31 are composed of a dynamic logic circuit as enclosed with a broken line for the first carry lookahead circuit CLA(1) as illustrated in FIG. 12 and the second carry lookahead circuit CLA(2) as illustrated in FIG. 17.

The priority encoder PE serves to calculate an output signal S<3:0> of the carry lookahead circuit and a PGB signal which is the inverted signal of the PG signal by the use of the PB signals, i.e., the inversion of the P signals, as input to the respective bits of the group. FIG. 14 is a circuit diagram showing the priority encoder PE in which the constituent NOR gate circuits NR11, NR21 and NR31 are composed of a dynamic logic circuit as enclosed with a broken line.

The selector circuit SELL is a dual-rail multiplexer comprising a 4-1 multiplexer MUX1 and a 4-1 multiplexer MUX2. The selector circuit SEL1 serves to calculate GG and KG signals by the use of the G and K signals as input to the respective bits of the group. FIG. 14 is a circuit diagram showing the selector circuit SEL1 as composed of PMOS FETs, NMOS FETs and NOT gate circuits.

FIG. 16 shows a timing chart for explaining the input/output operation of the carry lookahead circuit as illustrated in FIG. 12.

The P signal as indicated with solid lines and the PB signal as indicated with broken lines on the input signals are precharged when the clock signal CLK is in the "L" level and then separated into complementary levels when the clock signal CLK is in the "H" level. Namely, the P signal takes a logic one while the PB signal takes a logic zero while the P signal takes a logic zero while the PB signal takes a logic one. Also, if the P signal takes a logic one, both the K signal as indicated with solid lines and the K signal as indicated with broken lines take a logic zero while if the PB signal takes a logic one, any one of the K signal and the K signal takes a logic zero. The PG, PGB, GG and KG signals of the group are output in the same timing as the PG, PB, G and K signals.

Since the carry lookahead circuit as illustrated in FIG. 12 is not composed of logic gates connected in a tree arrangement, it is possible to perform a high speed operation.

Figure 17:
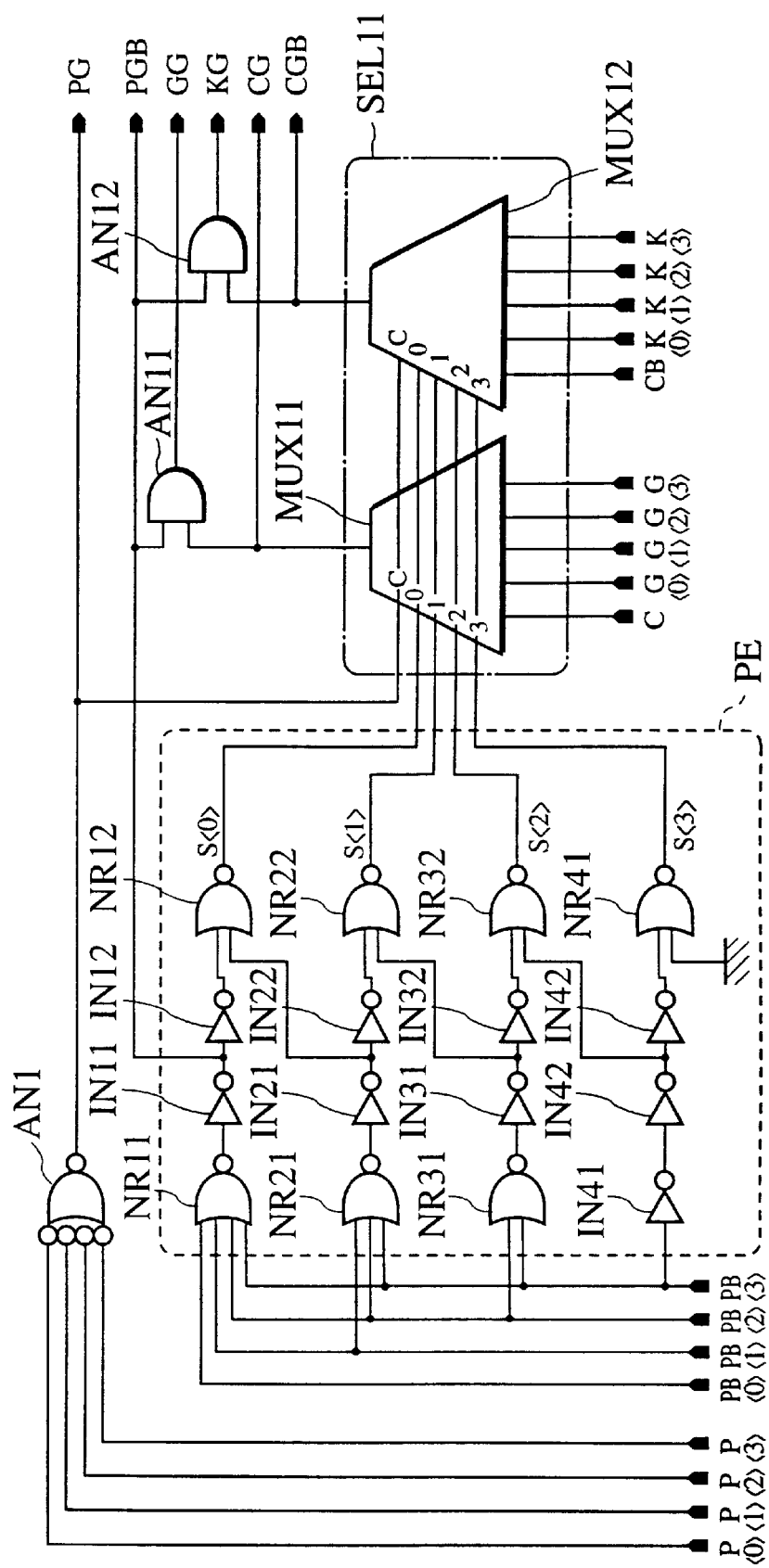
FIG. 17 is a circuit diagram showing a carry lookahead circuit which is provided with AND gate circuits AN11 and AN12 in addition to the carry lookahead circuit as illustrated in FIG. 12.
Figure 18:
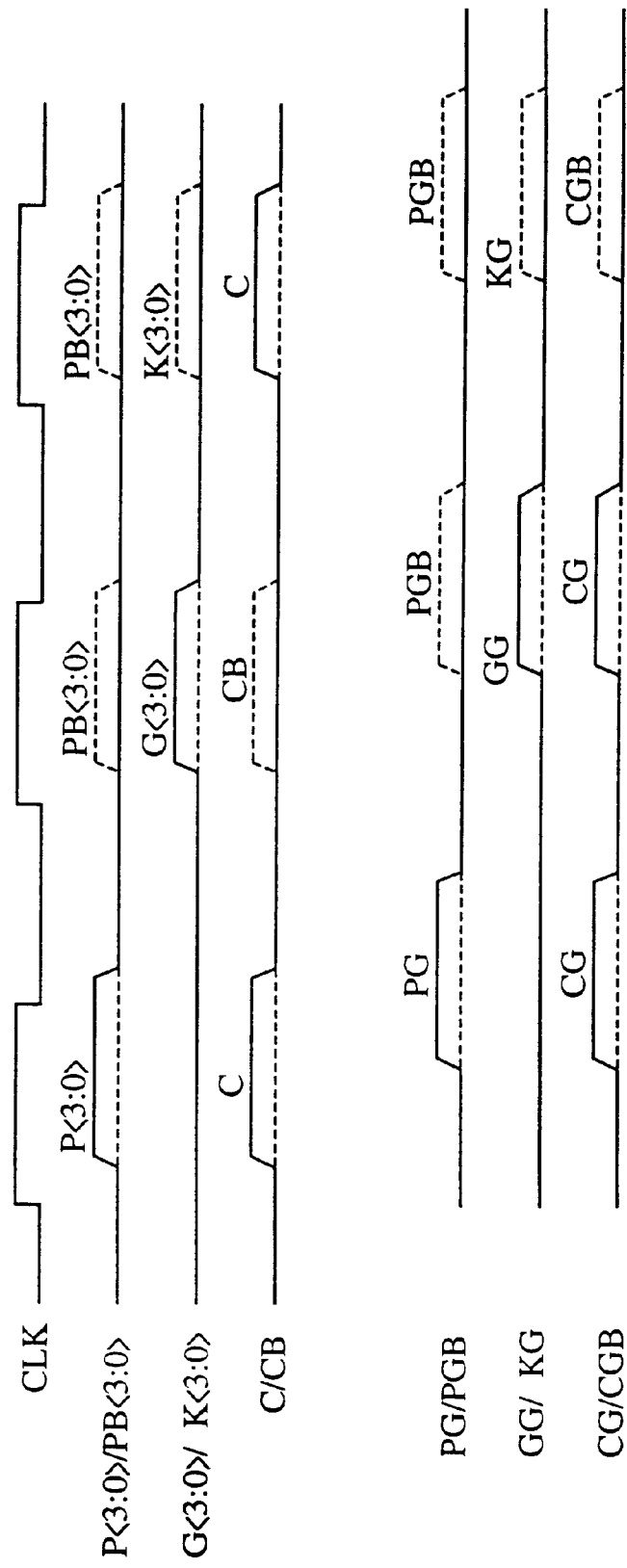
FIG. 18 shows a timing chart for explaining the input/output operation of the carry lookahead circuit as illustrated in FIG. 17.

FIG. 17 is a circuit diagram showing a carry lookahead circuit which is provided with AND gate circuits AN11 and AN12 in addition to the carry lookahead circuit as illustrated in FIG. 12. The other constituent elements as illustrated in FIG. 17 have the equivalent structures and functions of the counterparts as illustrated in FIG. 12 and given the similar references. The carry lookahead circuit serves to calculate PG, PGB, GG and KG signals of the group and the CG group carry signal of the group to be output by the use of the P, G and K signals as input to the respective bits of the group and the C carry signals as input to the group. Particularly, the carry lookahead circuit includes the AND gate circuit AN11 receiving the PGB signal and the output of the multiplexer MUX1 and the AND gate circuit AN12 receiving the PGB signal and the output of the the multiplexer MUX2. FIG. 18 shows a timing chart for explaining the input/output operation of the carry lookahead circuit as illustrated in FIG. 17.

In the case that the carry lookahead circuit is constructed as illustrated in FIG. 17, it is possible to output the group carry signal without a delay.

A plurality of the logic circuits as designed in the same manner as the carry lookahead circuit illustrated in FIG. 12 or FIG. 17 can be combined in a tree arrangement in order to form a larger carry lookahead circuit capable of handling a larger number of bits. In this case, the carry lookahead circuit as illustrated in FIG. 17 is located in the output stage.

In the followings, a carry lookahead circuit for use in the addition operation of integers having a number of bits will be explained in details.

The entirety of the bit sequence comprising N(=an integer) bits is divided into a plurality of groups each of which is composed of m bits (m<N) in accordance with this embodiment of the present invention. A group propagate signal PG, a group generate signal GG and a group kill signal KG representing each group are calculated by the use of the propagate signals P<i>, the generate signals G<i> and the kill signals K<i> of the respective bits within each group.

For example, in the case that N=16, m=4, an input signal A and an input signal B are divided into four groups as follows.

$$A=(a15\ to\ a12, a11\ to\ a8, a7\ to\ a4, a3\ to\ a0) \quad (1)$$

$$B=(b15\ to\ b12, b11\ to\ b8, b7\ to\ b4, b3\ to\ b0) \quad (2)$$

The carry signals C3, C7 and C11 for the respective groups will be obtained in accordance with the following equations.

$$C3=f(a3\ to\ a0, b3\ to\ b0) \quad (3)$$

$$C7=f(a7\ to\ a4, b7\ to\ b4)+C3 \quad (4)$$

$$C11=f(a11\ to\ a7, b11\ to\ b7)+C7 \quad (5)$$

$$C15=f(a15\ to\ a11, b15\ to\ b11)+C11 \quad (6)$$

In order to perform the above calculation for obtaining the carry signals of the respective groups, it is required to generate the group signals PG, GG and KG for the respective groups from the signals P, G and K for the respective constituent bits. FIG. 12 is referred to again as a block diagram showing a first carry lookahead circuit CLA(1) for performing the required operation to generate the group signals PG, GG and KG.

The first carry lookahead circuit CLA(1) serves to generate the group signals PG, GG and KG for the group of 4 bits. The signals P<3:0> (=P<3>~P<0>), G (=G<3>~G<0>) and K (=K<3>~K<0>) for the respective bits are generated in accordance with the following equations.

$$P<i>=/a<i>*/b<i>$$

$$G<i>=a<i>\ ExOR\ b<i>$$

$$K<i>=a<i>*b<i>$$

The first carry lookahead circuit CLA(1) is composed of an AND gate circuit AN1 serving to generate a signal PG, a priority encoder PE serving to generate selection signals S<3:0> and a selector circuit SEL1 serving to generate a signal GG and a signal KG.

The AND gate circuit AN1 receives all the P<3:0> and perform the AND operation in accordance with the following equation (7) in order to output the signal PG and the signal PGB as the inversion of the signal PG.

$$PG = P\langle 3\rangle * P\langle 2\rangle * P\langle 1\rangle * P\langle 0\rangle \quad (7)$$

$$\begin{aligned}PGB &= /(P\langle 3\rangle * P\langle 2\rangle * P\langle 1\rangle * P\langle 0\rangle) \\ &= /P\langle 3\rangle + /P\langle 2\rangle + /P\langle 1\rangle + /P\langle 0\rangle \\ &= PB\langle 3\rangle + /PB\langle 2\rangle + /PB\langle 1\rangle + /PB\langle 0\rangle\end{aligned} \quad (8)$$

This means that the group propagate signal PG is active only when all the states in the bit 0 to the bit 3 are propagate states, i.e., P<3:0>={1,1,1,1} in order to transfer the carry signal Cin as input from the previous group to the next group as a carry signal CG of that group. In this case, the signal GG and the signal KG are "0" respectively.

If at least one of P<3:0> is "0", the operation by the priority encoder PE is required. The priority encoder PE is composed of a NOR gate circuit NR11 receiving the propagate signals PB<3:0>, an inverter IN11 and an inverter IN12 receiving the output of the NOR gate circuit NR11, a NOR gate circuit NR12 receiving the outputs of the inverters IN12 and IN21, a NOR gate circuit NR21 receiving the inversion of the propagate signals PB<3:1>, an inverter IN21 and an inverter IN22 receiving the output of the NOR gate circuit NR21, a NOR gate circuit NR22 receiving the outputs of the inverters IN22 and IN31, a NOR gate circuit NR31 receiving the inversion of the propagate signals PB<3:2>, inverters IN31 and IN32 receiving the output of the NOR gate circuit NR31, a NOR gate circuit NR32 receiving the outputs of the inverters IN32 and IN42, inverters IN41, IN42 and IN43 receiving the inversion of the propagate signal PB<3> and a NOR gate circuit NR41 receiving the output of the inverter IN43 and the ground level "0". The NOR gate circuits NR12, NR22, NR32 and NR41 serve respectively to output the selection signal S<0> to S<3>.

The priority encoder PE serves to determine which of the signals G<3:0> should be output as a group generate signal GG in the case that at least one of P<3:0> is "0" (or at least one of PB<3:0> is "1"). Also, the priority encoder PE serves to determine which of the signals K<3:0> should be output as a group kill signal KG in the case that at least one of P<3:0> is "0". In this case, the signals PB<3:0> is searched from the most significant bit PB<3> to the least significant bit PB<0> for a first "1". If the bit PB<3> is the first "1", S<3>=0 and S<i>=1 where i=0 to 2. Also if the bit PB<3> is "0" and the bit PB<2> is the first "1", S<2>=0 and S<i>=1 where i=0,1,3. Only one of the signal S<3:0> is "1" while others of the signal S<3:0> are "0".

The selection signal S<3:0> is inputted to the selector circuit SEL1. The selector circuit SEL1 is composed of a multiplexer MUX1 and a multiplexer MUX2. The multiplexer MUX1 serves to receive the selection signal S<3:0> and select one of the signals G<3:0> corresponding to "1" in order to output the signal GG representing the group. Also, the multiplexer MUX2 serves to receive the selection signal S<3:0> and select one of the signals K<3:0> corresponding to "1" in order to output the signal KG representing the group.

The signal GG and the signal KG are expressed by the following equations.

$$GG = P\langle3\rangle * P\langle2\rangle * P\langle1\rangle * G\langle0\rangle + P\langle3\rangle * P\langle2\rangle * G\langle1\rangle + P\langle3\rangle * G\langle2\rangle + G\langle3\rangle \quad (9)$$

$$KG = P\langle3\rangle * P\langle2\rangle * P\langle1\rangle * K\langle0\rangle + P\langle3\rangle * P\langle2\rangle * K\langle1\rangle + P\langle3\rangle * K\langle2\rangle + K\langle3\rangle \quad (10)$$

The signal GG and the signal KG are also expressed by the use of the selection signal S<3:0> as follows. Then, from the equation of $$P\langle3\rangle * PB\langle3\rangle = P\langle2\rangle * PB\langle2\rangle = P\langle1\rangle * PB\langle1\rangle = P\langle0\rangle * PB\langle0\rangle = 0 \quad (23)$$

the above equations (11) to (18) are rearranged as $$S\langle0\rangle = P\langle3\rangle * P\langle2\rangle * P\langle1\rangle * (PB\langle3\rangle + PB\langle2\rangle + PB\langle1\rangle + PB\langle0\rangle) \quad (24)$$
$$= P\langle3\rangle * P\langle2\rangle * P\langle1\rangle * PB\langle0\rangle$$

$$S\langle1\rangle = P\langle3\rangle * P\langle2\rangle * (PB\langle3\rangle + PB\langle2\rangle + PB\langle1\rangle) = P\langle3\rangle * P\langle2\rangle * PB\langle1\rangle \quad (25)$$

$$S\langle2\rangle = P\langle3\rangle * (PB\langle3\rangle + PB\langle2\rangle) = P\langle3\rangle * PB\langle2\rangle \quad (26)$$

$$S\langle3\rangle = 1 * PB\langle3\rangle = PB\langle3\rangle. \quad (27)$$

Also, from the equations of $$PB\langle3\rangle * G\langle3\rangle = G\langle3\rangle, PB\langle2\rangle * G\langle2\rangle = G\langle2\rangle, PB\langle1\rangle * G\langle1\rangle = G\langle1\rangle, PB\langle0\rangle * G\langle0\rangle = G\langle0\rangle$$

the following logic equations are obtained.

$$S\langle0\rangle * G\langle0\rangle + S\langle1\rangle * G\langle1\rangle + S\langle2\rangle * G\langle2\rangle + S\langle3\rangle * G\langle3\rangle = \quad (28)$$
$$P\langle3\rangle * P\langle2\rangle * P\langle1\rangle * PB\langle0\rangle * G\langle0\rangle + P\langle3\rangle * P\langle2\rangle * PB\langle1\rangle * G\langle1\rangle +$$
$$P\langle3\rangle * PB\langle2\rangle * G\langle2\rangle + PB\langle3\rangle * G\langle3\rangle =$$
$$P\langle3\rangle * P\langle2\rangle * P\langle1\rangle * G\langle0\rangle + P\langle3\rangle * P\langle2\rangle * G\langle1\rangle +$$
$$P\langle3\rangle * G\langle2\rangle + G\langle3\rangle = GG$$

$$S\langle0\rangle * G\langle0\rangle + S\langle1\rangle * G\langle1\rangle + S\langle2\rangle * G\langle2\rangle + S\langle3\rangle * K\langle3\rangle = \quad (29)$$
$$P\langle3\rangle * P\langle2\rangle * P\langle1\rangle * PB\langle0\rangle * K\langle0\rangle +$$
$$P\langle3\rangle * P\langle2\rangle * PB\langle1\rangle * K\langle1\rangle + P\langle3\rangle * PB\langle2\rangle * K\langle2\rangle + PB\langle3\rangle * K\langle3\rangle =$$
$$P\langle3\rangle * P\langle2\rangle * P\langle1\rangle * K\langle0\rangle + P\langle3\rangle * P\langle2\rangle * K\langle1\rangle +$$
$$P\langle3\rangle * K\langle2\rangle + K\langle3\rangle = KG$$

Then, the following logic equations (30) and (31) are obtained.

$$GG = S\langle0\rangle * G\langle0\rangle + S\langle1\rangle * G\langle1\rangle + S\langle2\rangle * G\langle2\rangle + S\langle3\rangle * K\langle3\rangle \quad (30)$$

$$KG = S\langle0\rangle * K\langle0\rangle + S\langle1\rangle * K\langle1\rangle + S\langle2\rangle * K\langle2\rangle + S\langle3\rangle * K\langle3\rangle \quad (31)$$

The selection signal S<3:0> are generated on the basis of the logics relating to the priority encoder as illustrated in FIG. 12 and the logic equations (8) and (24) to (27).

Namely, if PB<i>=1 as a first "1" in the sequence of PB<3>, PB<2>, PB<1> and PB<0>, then S<i>=1 and S<j>=1 (j≠i) while PBG=1.

On the other hand, if all the bits of PB<3:0> are "0", all the bits of S<3:0> are "0" while PBG=0.

Accordingly, the equation (30) means that the logic for generating the signal GG can be implemented by a 4-1 multiplexer serving to select one of the signals G<3:0> in accordance with the selection signals S<3:0>. Also, the equation (31) means that the logic for generating the signal KG can be implemented by a 4-1 multiplexer serving to select one of the signals K<3:0> in accordance with the selection signals S<3:0>.

As detailedly explained in the above, the first carry lookahead circuit CLA(1) serves to a group generate signals GG, a group generate signal GG and a group kill signal KG for a group of 4 bits by means of the AND gate circuit AN1, the priority encoder PE and the selector circuit SEL1.

While the first carry lookahead circuit CLA(1) is adapted to generate all the signal PG, the signal GG and the signal KG in accordance with the present invention, the circuit may be designed in order to generate only the signal PG and the signal GG or only the signal PG and the signal KG. In the case that only the signal PG and the signal GG are generated, the selector circuit SEL1 is composed only of the multiplexer MUX1. Also, in the case that only the signal PG and the signal KG are generated, the selector circuit SEL1 is composed only of the multiplexer MUX2.

Next, the second carry lookahead circuit CLA(2) will be explained. Unlike the first carry lookahead circuit CLA(1), the second carry lookahead circuit CLA(2) serves to generate not only the group propagate signal PG, the group generate signal GG and the group kill signal KG within the group, but also the group carry signal CG by the use of the group propagate signal PG, the group generate signal GG and the group kill signal KG. More specifically described, while the AND gate circuit AN1 and the priority encoder PE are designed in the same manner as those of the above embodiment as illustrated in FIG. 12, a different type selector circuit SEL11 and AND gate circuits AN11 and AN12 are utilized.

The selector circuit SEL11 is composed of a multiplexer MUX11 and a multiplexer MUX12. The multiplexer MUX11 receives the selection signal S<3:0>, the generate signals G<3:0> for respective bits as outputted from the priority encoder PE, the carry signal C from the previous (lower) group and the group propagate signals PG as outputted from the AND gate circuit AN1. On the other hand, the multiplexer MUX12 receives the selection signal S<3:0>, the generate signals K<3:0> for respective bits, the inversion of the carry signal CB as outputted from the previous (lower) group and the group propagate signals PG.

As described above, all the the signals P<3:0> are "1", the second carry lookahead circuit CLA(2) outputs the signal PG of "1" and the signal PGB of "0". In this case, the carry signal C as outputted from the previous (lower) group and the inversion of the carry signal CB are output as the group carry signal CG and the inversion of the group carry signal CGB, while the signal PGB is "0". Accordingly, the AND gate circuits AN11 and AN12 receiving the signal PGB serve to output the signal GG of "0" and the signal KG of "0" respectively.

In the case that at least one of P<3:0> is "0", the signal PG is "0" and the signal PGB is "1". The generation of the signal CG and the signal CGB in this case is performed by selecting the signal G<i> and the signal K<i> corresponding to the selection signal S<i> taking "1" and outputting them as the group carry signal CG and the inversion of the group carry signal CGB. Furthermore, the AND gate circuit AN11 receiving the signal CG and the signal PGB taking "1" serves to generate the signal GG. On the other hand, the AND gate circuit AN12 receiving the signal CGB and the signal PGB taking "1" serves to generate the signal KG.

The signal CG is expressed by the following equations.

$$CG = PG * Cin + GG \quad (32)$$

$$CGB = /CG = PG*/Cin + KG \quad (33)$$

The signal CG and the signal CGB are then expressed by the following equations.

$$CG=PG*\text{Cin}+S{<}0{>}*G{<}0{>}+S{<}1{>}*G{<}1{>}+S{<}2{>}*G{<}2{>}+S{<}3{>}*G{<}3{>} \quad (34)$$

$$CGB=PG*/\text{Cin}+S{<}0{>}*K{<}0{>}+S{<}1{>}*K{<}1{>}+S{<}2{>}*K{<}2{>}+S{<}3{>}*K{<}3{>} \quad (35)$$

In this case, from the above equations (7), (24) to (27), only one of the signal PG and the signals S<3:0> is "1" while all the remaining signals are "0".

Accordingly, it will be understood from the above equations (34) and (35) that the logic for generating the group carry signal CG can be implemented with a 5-1 multiplexer serving to select one of the signal Cin and the signals G<3:0> and that the logic for generating the inversion of the group carry signal CGB can be implemented with a 5-1 multiplexer serving to select one of the signal PG and the signals G<3:0>. From the above equations (9), (10), (32) and (33), the following relationships are obtained.

$$CG*PGB=GG \quad (36)$$

$$CGB*PGB=KG \quad (37)$$

Accordingly, as explained above, CG=GG and KG=CGB in the case that PG=0 (PGB=1) from the above equation (36). FIG. 18 shows a timing chart for explaining the input/output operation of the second carry lookahead circuit CLA(2). In the same figure, the solid lines designate the levels of the propagate signals P, the generate signals G and the kill signals K while the broken lines designate the levels of the levels of the inversion signals thereof PB, GB and KB.

The signals P<3:0>, the signals G<3:0> and the signals K<3:0> are given together with the group carry signal C as outputted from the previous (lower) group in synchronism with the clock signal CLK. The group propagate signal PG, the group generate signal GG and the group kill signal KG are then outputted in the same timing with the delay time required for completing the operation.

While the second carry lookahead circuit CLA(2) is adapted to generate all the signal PG, the signal GG and the signal KG, the signal CG and the signal CGB in accordance with this embodiment of the present invention, the circuit may be designed in order to generate only the signal PG, the signal GG and the signal CG or only the signal PG, the signal KG and the signal CGB. In the case that only the signal PG, the signal GG and the signal CG are generated, the selector circuit SEL11 is composed only of the multiplexer MUX1 for generating the signal CG through the AND gate circuit AN11. Also, in the case that only the signal PG, the signal KG and the signal CGB are generated, the selector circuit SEL11 is composed only of the multiplexer MUX2 for generating the signal KG through the AND gate circuit AN12.

Figure 19:
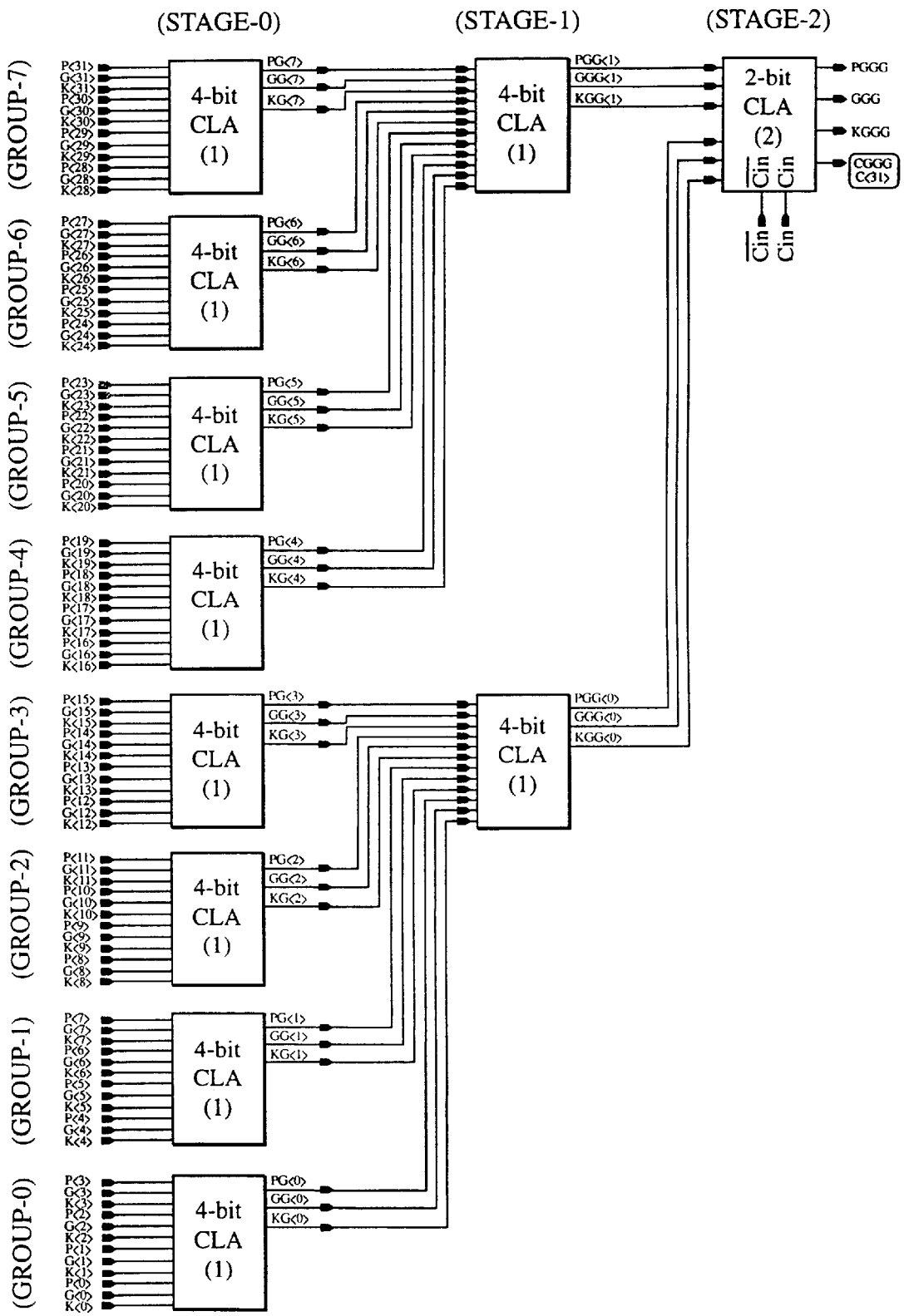
FIG. 19 is a block diagram showing the configuration of the carry lookahead circuit by making use of both the first carry lookahead circuit CLA(1) as illustrated in FIG. 12 and the second carry lookahead circuit CLA(2) as illustrated in FIG. 17.

Next, a 32-bit carry lookahead circuit will be explained. FIG. 19 is a block diagram showing the configuration of the carry lookahead circuit by making use of both the first carry lookahead circuit CLA(1) as illustrated in FIG. 12 and the second carry lookahead circuit CLA(2) as illustrated in FIG. 17. The carry lookahead circuit includes three group stages 0 to 2. the group stages 0 and 1 are composed of a plurality of the first carry lookahead circuits CLA(1) while the group stage 2 is composed of the second carry lookahead circuit CLA(2).

The carry lookahead circuits belonging to the groups 7 to 0 serve to generate the signal PG<7>, GG<7>, KG<7>, PG<6>, GG<6>, KG<6>, . . . , PG<0>, GG<0> and KG<0> in the group stage 0.

The carry lookahead circuits in the group stage 1 are connected to the groups 7 to 4 and serve to generate the signal PGG<1>, GGG<1>, KGG<1>, PGG<0>, GGG<0> and KGG<0> for the groups 7 to 4 while the carry lookahead circuits belonging to the groups 3 to 0 also serve to generate the signal PGG<1>, GGG<1>, KGG<1> to PGG<0>, GGG<0> and KGG<0>.

In the group stage 2, the signals PGGG, GGGG and KGGG for entire 32 bits are generated together with the final carry signal CGGG by means of the second carry lookahead circuit CLA(2). The signal CGGG corresponds to the carry signal C<31>.

Figure 4:
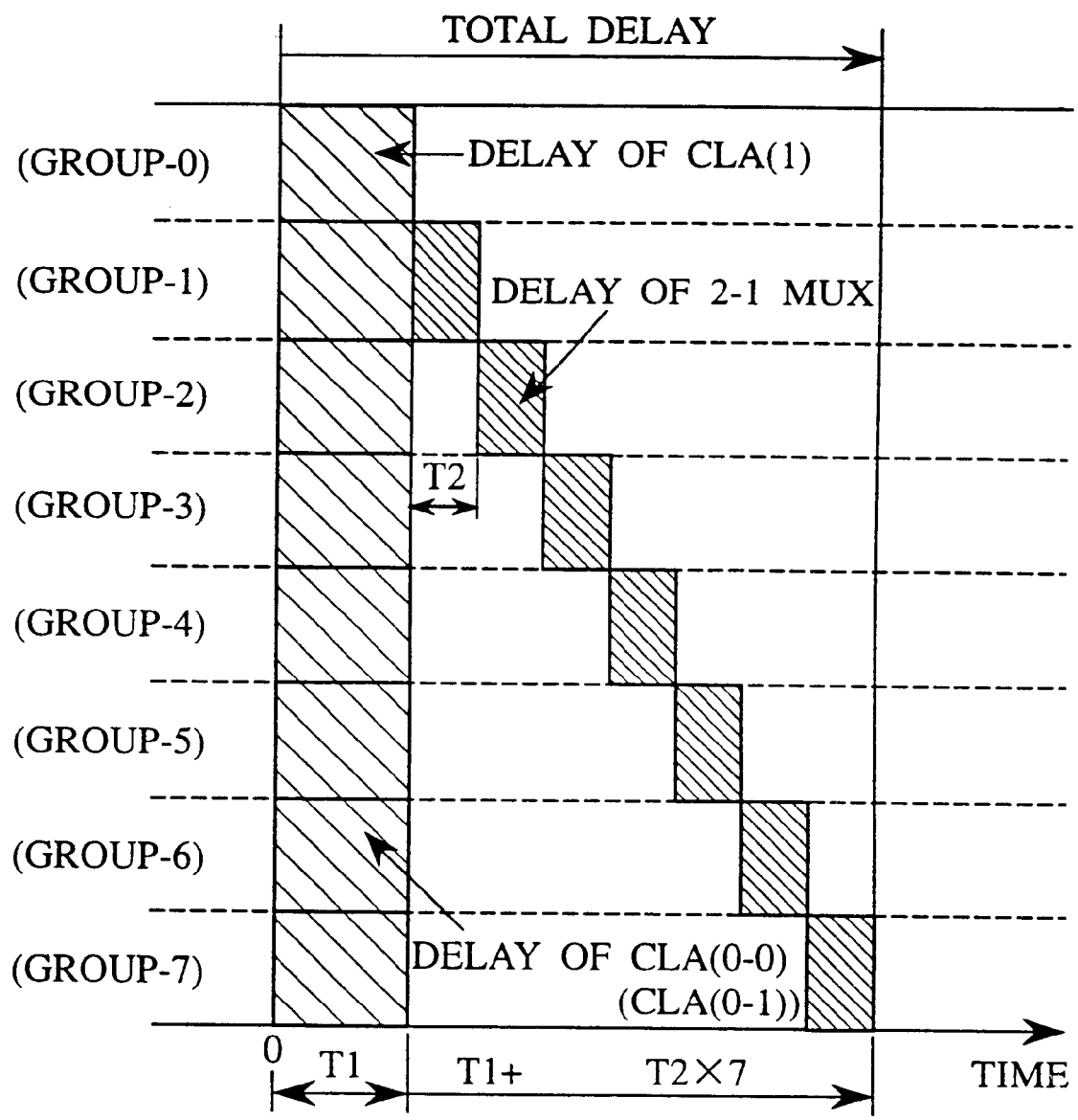
FIG. 4 shows the delay time required for completing the calculation, i.e., the delay time required for generating the carry signals C<0> to C<31>.
Figure 20:
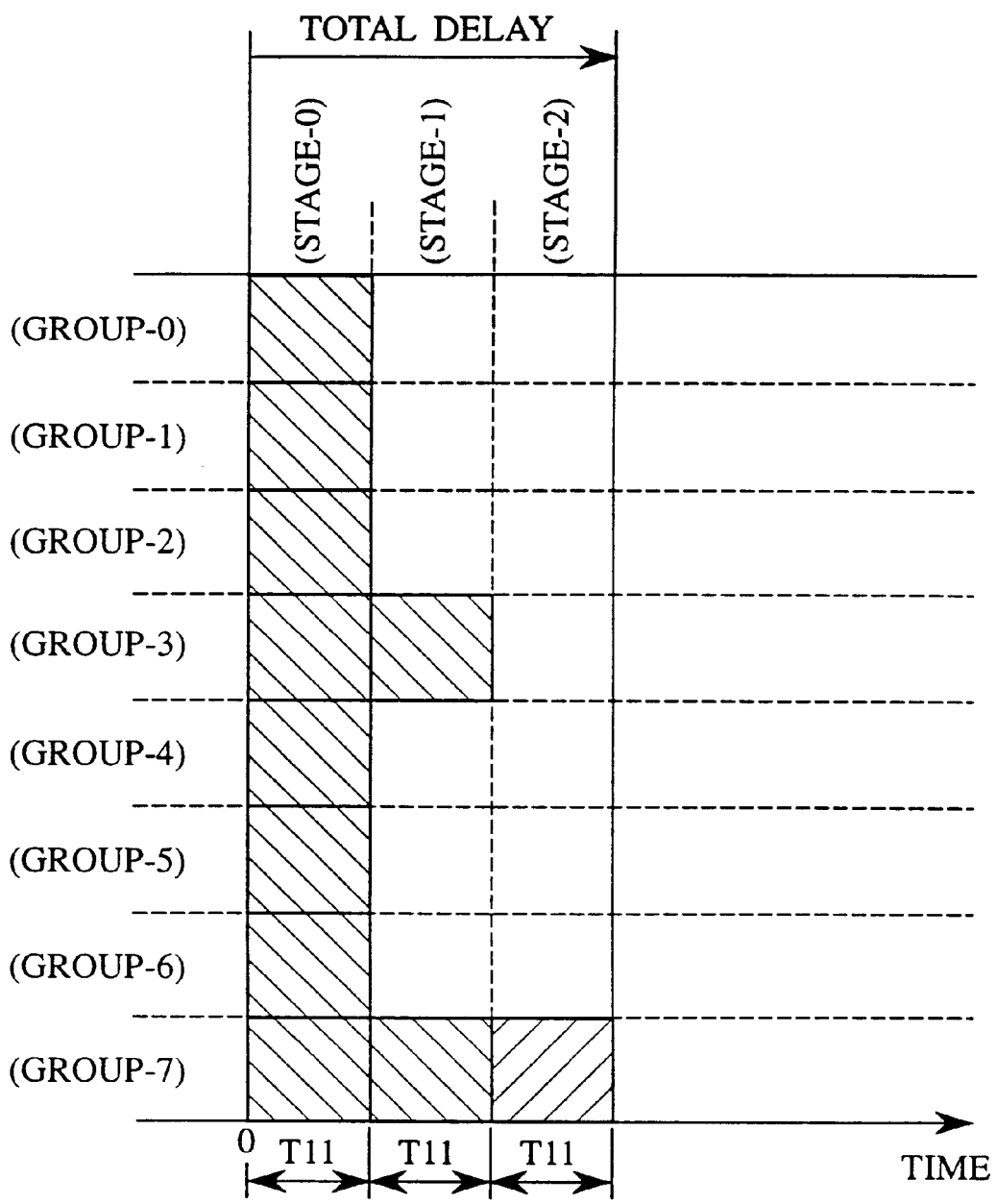
FIG. 20 is a graphic diagram showing the time required for completing the calculation in the carry lookahead circuit as illustrated in FIG. 19.
Figure 22A:
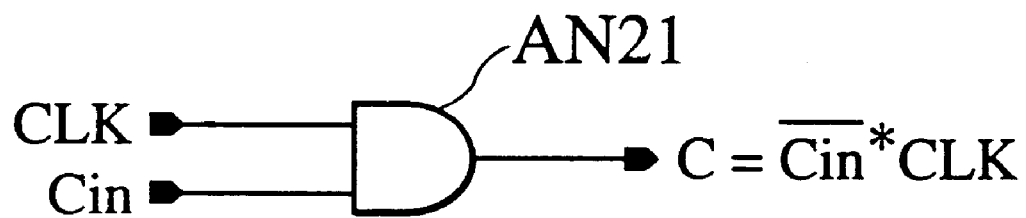
FIG. 22(a) is an exemplary circuit diagram composed of an AND gate circuit AN21 for generating the carry signal Cin for the respective constituent bits in synchronism with the clock signal CLK.
Figure 22B:
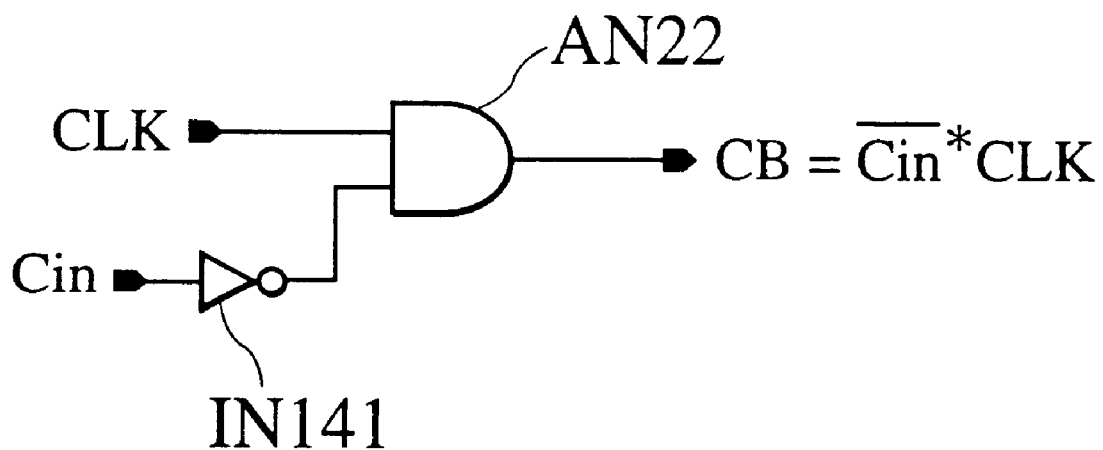
FIG. 22(b) is an exemplary circuit diagram composed of an AND gate circuit AN22 and an inverter IN141 for generating the inversion of the carry signal /Cin for the respective constituent bits in synchronism with the clock signal CLK.

FIG. 20 is a graphic diagram showing the time required for completing the calculation in the carry lookahead circuit as designed above. If the group stage 0, the group stage 1 and the group stage 2 have the same delay time T11, the total delay time is T11*3. The total delay time T11*3 is the time accumulated through the three stages. Accordingly, it will be understood that the time required for completing the calculation is significantly reduced in accordance with the present invention as compared with the case in accordance with the prior art carry lookahead circuit as illustrated in FIG. 4.

Figure 13A:
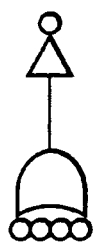
FIG. 13(a) is a block diagram showing the AND gate circuit AN1 of the firs and second carry lookahead circuits.
Figure 13B:
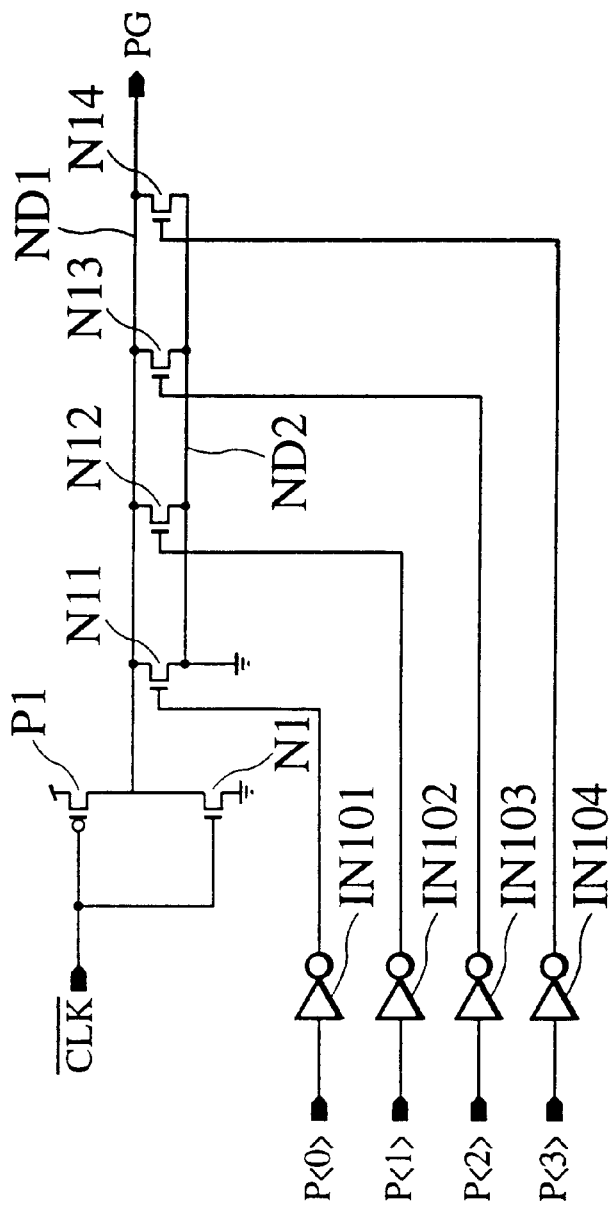
FIG. 13(b) is a block diagram showing a pseudo-NMOS NAND gate circuit known as a pseudo-NMOS circuit as illustrated in FIG. 13(a).

The AND gate circuit AN1 is constructed as illustrated in FIG. 13(b) by combining inverters and a pseudo-NMOS NAND gate circuit known as a pseudo-NMOS circuit as illustrated in FIG. 13(a). The NMOS FET N1 connected between the ground terminal and the node ND1 is turned on, when the clock signal CLK is in a low level, in order to discharge the node ND1. When the clock signal CLK is in a high level, the PMOS FET is turned on while the NMOS FET N1 connected between the ground terminal and the node ND1 is turned off.

The signals P<3:0> is inverted through the inverters IN104 to IN101 and inputted to the gates of the NMOS FETs N14 to N11 respectively connected between the node ND1 and the node ND2. Only when all the signals P<3:0> are "1", the NMOS FET N14 to N11 are turned off in order to discharge the node ND1 by means of the PMOS FET P1 and to generate the signal PG of "1". When at least one of the signals P<3:0> is "0", the FET receiving the "0" is turned on in order that the node ND1 is connected to the ground terminal by means of the PMOS FET P1 and that the signal PG of "0" is generated. Meanwhile, the PMOS FET P1 is designed with such a narrow channel width that the node ND1 is pulled down near to the ground level, when only one of the NMOS FETs N11 to N14 is turned on, even if the PMOS FET P1 is turned on.

The circuit operation can be improved by the use of the pseudo-NMOS And circuit AN1 can be operated in synchronism.with the clock signal CLK.

FIG. 14 is a circuit diagram showing the priority encoder PE in which the constituent NOR gate circuits NR11, NR21 and NR31 are composed of a dynamic logic circuit as enclosed with a broken line for the first carry lookahead circuit CLA(1) as illustrated in FIG. 12 and the second carry lookahead circuit CLA(2) as illustrated in FIG. 17. The priority encoder PE is driven in synchronism with the clock signal CLK in accordance with the dynamic operation. The signals PB<3:0> is input to a NOR gate circuit which is composed of PMOS FET P11 to P14 and NMOS FETs P21 to N32. The PMOS FETs P11 to P14 are connected between the power terminal and nodes ND11 to ND14 and controlled by the clock signal CLK applied to the clock signal CLK. When the clock signal CLK is in a low level, the nodes ND11 to ND14 are precharged.

NMOS FET N21 to N24 are connected in parallel between the node ND11 and the node ND21 while an NMOS FET N25 is connected between the node ND21 and the ground terminal. NMOS FET N26 to N28 are connected in parallel between the node ND12 and the node ND22 while an NMOS FET N29 is connected between the node ND22 and the ground terminal. NMOS FETs N30 and N31 are connected in parallel between the node ND13 and the node ND23 while the NMOS FET N32 is connected between the NMOS FET N23 and the NMOS FET N32. Furthermore, an NMOS FET N33 is connected between the node ND14 and the node ND24 while the NMOS FET N34 is connected between the node ND24 the ground terminal.

The clock signal CLK is input to the gate terminals of NMOSs FETN 25, N29, N32 and N34. The signal PB<0> is input to the gate terminals of the NMOS FET N21. The signal PB<1> is input to the gate terminals of the NMOS FET N22 and the NMOS FET N26. The signal PB<2> is input to the gate terminals of NMOS FETs N23, N27 and, N30. The signal PB<3> is input to the gate terminals of NMOS FETs N24, N28, N31 and N33.

When the clock signal CLK is in a low level, the PMOS FETs P11 to P14 are turned on while the NMOS FETs N25, N29, N32 and N34 are turned off in order to charge the nodes ND11 to ND14. When the clock signal CLK is in a high level, the NMOS FETs N25, N29, N32 and N34 are turned on in order to make it possible to discharge the nodes ND21 to ND24.

A high level signal is output through the node ND11 only in the case that all of the signals PB<3:0> are in logic "0" while a low level signal is output and is inverted by means of the inverter IN111 in order to generate the signal PGB in the case that at least one of the signals PB<3:0> is in the logic "1". Also, a high level signal is output through the node ND12 only in the case that all of the signals PB<3:1> are in logic "0" while a low level signal is output in the case that at least one of the signals PB<3:0> is in the logic "1". The low level signal is then inverted by means of the inverter IN113 and input to the NOR gate circuit NR101 together with the output of the inverter IN112 in order to generate the signal S<0>. Also, a high level signal is output through the node ND13 only in the case that all of the signals PB<3:2> are in logic "0" while a low level signal is output in the case that at least one of the signals PB<3:2> is in the logic "1". The low level signal is then inverted by means of the inverter IN115 and input to the NOR gate circuit NR102 together with the output of the inverter IN114 in order to generate the signal S<1>. Also, a high level signal is output through the node ND14 only in the case that the signals PB<3> is in logic "0" while a low level signal is output in the case that the signal PB<3> is in the logic "1". The low level signal is then inverted by means of the inverter IN117 and input to the NOR gate circuit NR101 together with the output of the inverter IN116 in order to generate the signal S<0>. The output of the inverter IN117 is inverted by means of the inverter IN118 and inverted again by means of the NOR gate circuit NR104 in order to generate the signal S<3>.

Figure 15A:
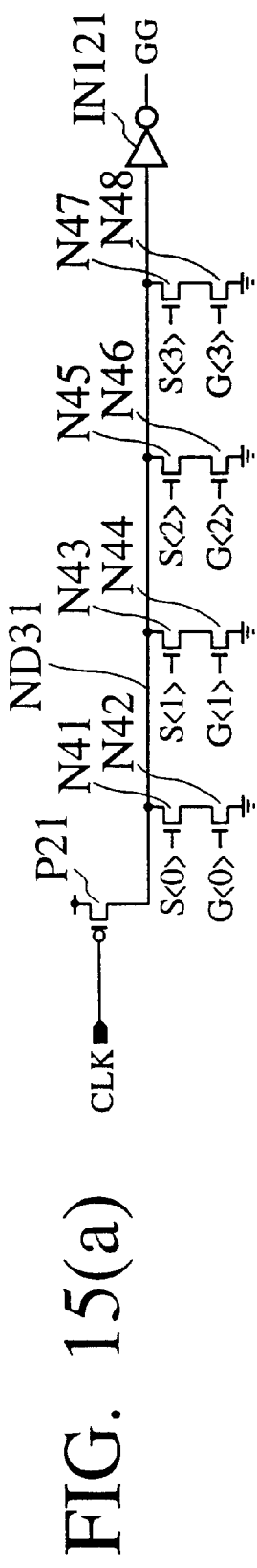
FIG. 15(a) and FIG. 15(b) are circuit diagrams showing the selector circuit SEL1 of the first carry lookahead circuit CLA(1) as illustrated in FIG. 12, as composed of PMOS FETs, NMOS FETs and NOT gate circuits.
Figure 15B:
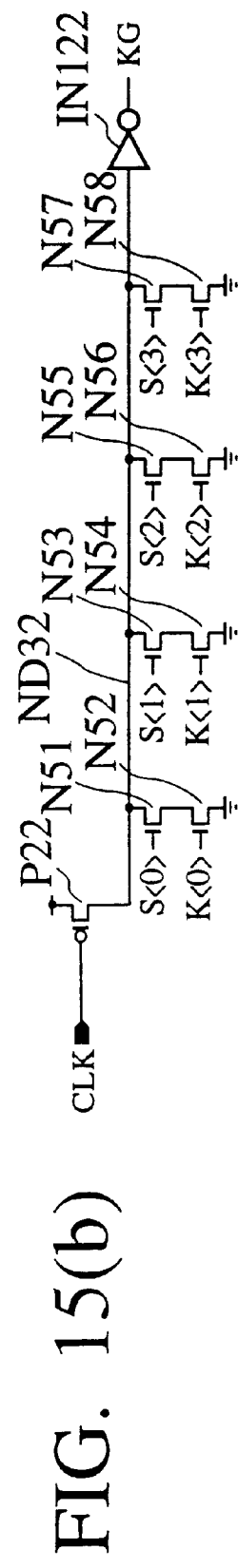

FIG. 15(a) and FIG. 15(b) are circuit diagrams showing the selector circuit SEL1 as composed of PMOS FETs, NMOS FETs and NOT gate circuits.

The selector circuit SEL1 is composed of the multiplexer MUX1 as illustrated in FIG. 15(a) and the multiplexer MUX2 as illustrated in FIG. 15(b). The multiplexer MUX1 is constructed as follows. A PMOS FET P21 connected between the power terminal and the node ND31. The NMOS FETs N41 and N42 are connected in series between the node ND31 and the ground terminal. The NMOS FETs N43 to N48 is connected respectively in parallel between the NMOS FETs N41 and N42. The signals S<0:3> are input to the gate terminals of the NMOS FETs N41, N43, N45 and N47 while the signals G<0:3> are input to the gate terminals of the NMOS FETs N42, N44, N46 and N48.

When the clock signal CLK is in a low level, the PMOS FET P21 is turned on in order to charge the node ND31. When the clock signal CLK is in a high level, the node ND31 is pulled down to the low level if at least one pair of signals S<0> and G<0>, signals S<1> and G<1>, signals S<2> and G<2> and signals S<3> and G<3> is {1,1}. The level of the node ND31 is inverted by means of the inverter IN121 in order to generate the signal GG.

The multiplexer MUX2 has a corresponding configuration as the multiplexer MUX1 whose signals G<0:3> are replaced by the signals K<0:3>. The PMOS FET PT 22 is connected between the power terminal and the node ND32. The NMOS FETs N51 and N52 are connected in series between the ground terminal and the node ND32. The NMOS FETs N41 and N42 are connected in series between the node ND31 and the ground terminal. The NMOS FETs N53 to N58 is connected respectively in parallel between the NMOS FETs N51 and N52. The signals S<0:3> are input to the gate terminals of the NMOS FETs N51, N53, N55 and N57 while the signals G<0:3> are input to the gate terminals of the NMOS FETs N52, N54, N56 and N58.

When the clock signal CLK is in a low level, the PMOS FET P22 is turned on in order to charge the node ND32. When the clock signal CLK is in a high level, the node ND32 is pulled down to the low level if at least one pair of signals S<0> and K<0>, signals S<1> and K<1>, signals S<2> and K<2> and signals S<3> and K<3> is {1,1}. The level of the node ND32 is inverted by means of the inverter IN122 in order to generate the signal KG.

The propagate signal P, the propagate signal G and the propagate signal K are generated for example by means of the logic circuits as illustrated in FIG. 21(a) to FIG. 21(d). FIG. 21(a) shows a logic circuit for inputting an input signal A and an input signal B and the inversions of the input signal A and the input signal B and outputting the logic sum of the input signal A and the input signal B. The clock signal CLK is input to the gate terminals of a PMOS FET P31 in order to charge the node ND41 when the clock signal CLK is in a low level. When the clock signal CLK is in a high level, the NMOS FET N63 is turned on. The signals A, /B, /A and B are input to the gate terminals of NMOS FET N61, N62, N64 and N65 in order to maintain the level of the node ND41 as selectively charged in accordance with the combination of the signals. The level of the node ND41 is inverted by means of the inverter IN131 and output as the signal P.

FIG. 21(b) shows a logic circuit for inputting an input signal A and an input signal B and the inversions of the input signal A and the input signal B and outputting the inversion of the logic sum of the input signal A and the input signal B. The logic circuit as illustrated in FIG. 21(b) has a corresponding configuration as the logic circuit as illustrated in FIG. 21(a) in which the gate terminals of NMOS FET N61, 62, 64 and 65 are adapted to receive A, B, /A and /B rather than A, /B, /A and B.

FIG. 21(c) shows a logic circuit for inputting an input signal A and an input signal B and outputting the logic product of the input signal A and the input signal B. The clock signal CLK is input to the gate terminals of a PMOS FET P33 in order to charge the node ND43 when the clock signal CLK is in a low level. The signals A and B are input to the gate terminals of the NMOS FET N81 and the NMOS FET N82 in order to maintain the level of the node ND41 as selectively charged in accordance with the combination of the signals. When the clock signal CLK is in a high level, the NMOS FET N83 is turned on by the clock signal CLK. The level of the node ND43 is inverted by means of the inverter IN133 and output as the signal B.

FIG. 21(d) shows a logic circuit for inputting an input signal A and an input signal B and outputting the exclusive logic sum of the input signal A and the input signal B. The logic circuit as illustrated in FIG. 21(d) has a corresponding configuration as the logic circuit as illustrated in FIG. 21(c) in which the gate terminals of NMOS FET N81 and 82 are adapted to receive /A and /B rather than A, and B.

Figure 1:
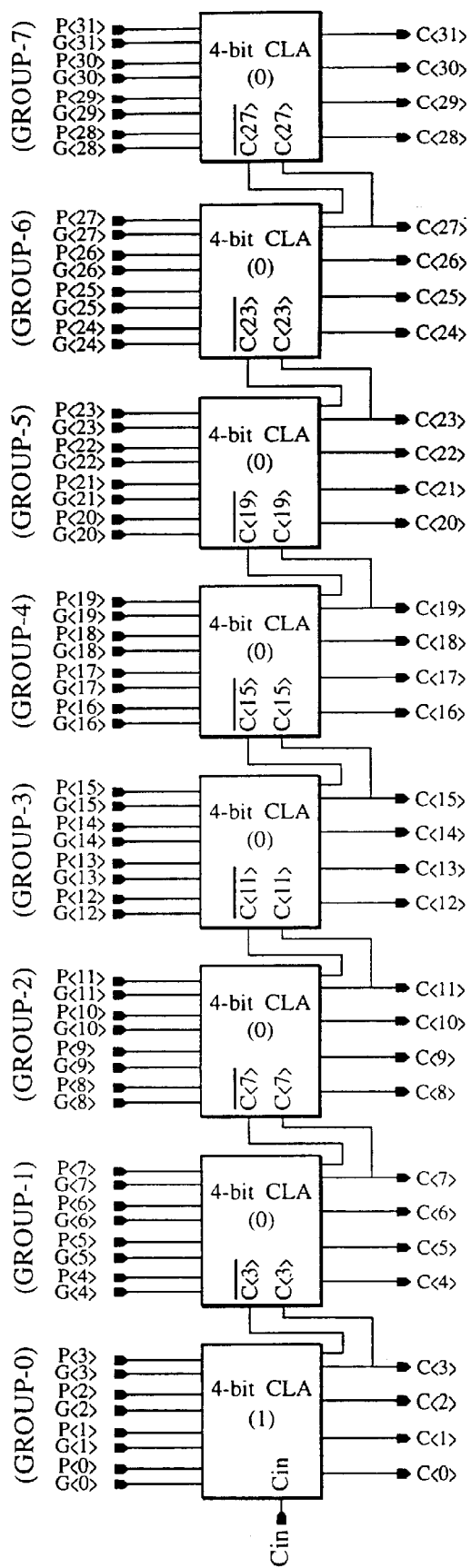
FIG. 1 is a circuit diagram showing a carry lookahead circuit capable of handling 32 bits in accordance with a prior art technique.
Figure 2:
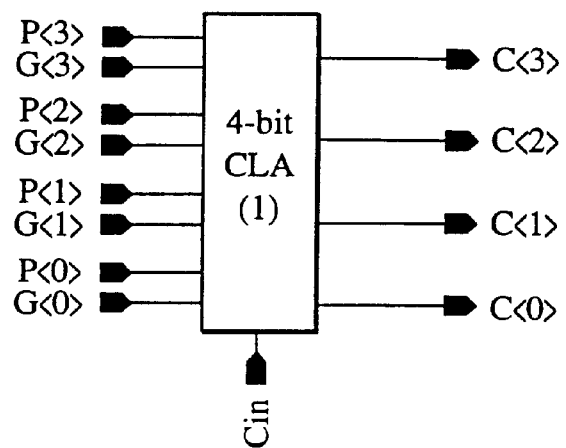
FIG. 2 is a circuit diagram showing a constituent carry lookahead circuit as part of the carry lookahead circuit as illustrated in FIG. 1.
Figure 3:
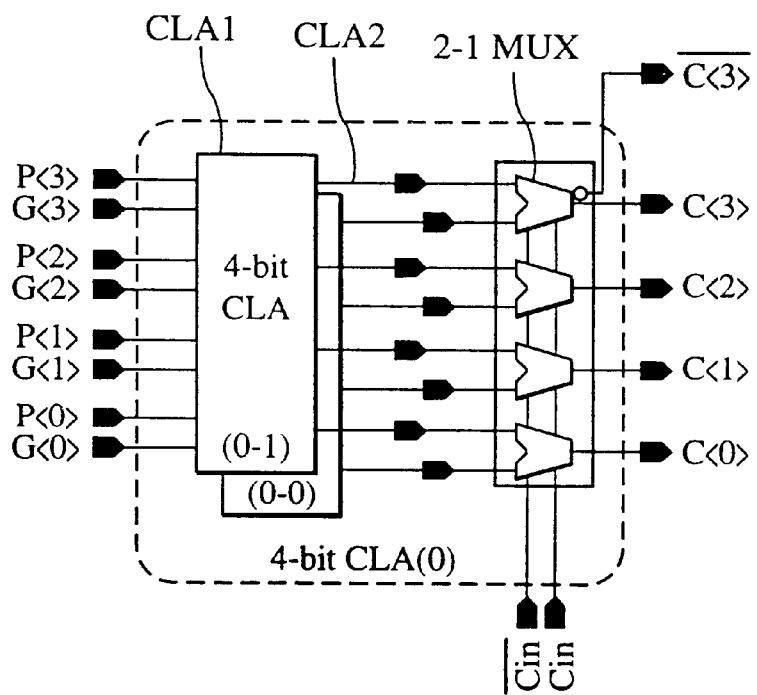
FIG. 3 is a block diagram showing an exemplary carry select adder which performs the addition operation both in the case that the carry-in signal is "0" and in the case that the carry-in signal is "1" and, in accordance with the carry out from the lower bit operation, either result of the addition operation is selected and output as a correct result.

Furthermore, FIG. 1(a) is an exemplary circuit diagram composed of an AND gate circuit AN21 for generating the carry signal Cin for the respective constituent bits in synchronism with the clock signal CLK while FIG. 1(b) is an exemplary circuit diagram composed of an AND gate circuit AN22 and an inverter IN141 for generating the inversion of the carry signal /Cin for the respective constituent bits in synchronism with the clock signal CLK.

As explained above, in the case of the carry lookahead circuit in accordance with the present invention, it is possible to reduce the delay time required for completing the calculation by obtaining group propagate signals, group generate signals and group kill signals for each m bits by the use of the respective propagate signals, generate signals and kill signals respectively for each of m bits.

In accordance with the circuit design as illustrated in FIG. 19, 32 bits are divided into 16 groups each consisting of 4 bits to generate the signal PG, the signal GG and the signal KG in three stages in accordance with the circuit design as illustrated in FIG. 19. However, the base bit strings can have a arbitrary number of bits and divided into a arbitrary number of groups. Furthermore, the AND gate circuit AN1, the priority encoder PE and the selector circuit SE may be modified in accordance with the actual cases.

Figure 23:
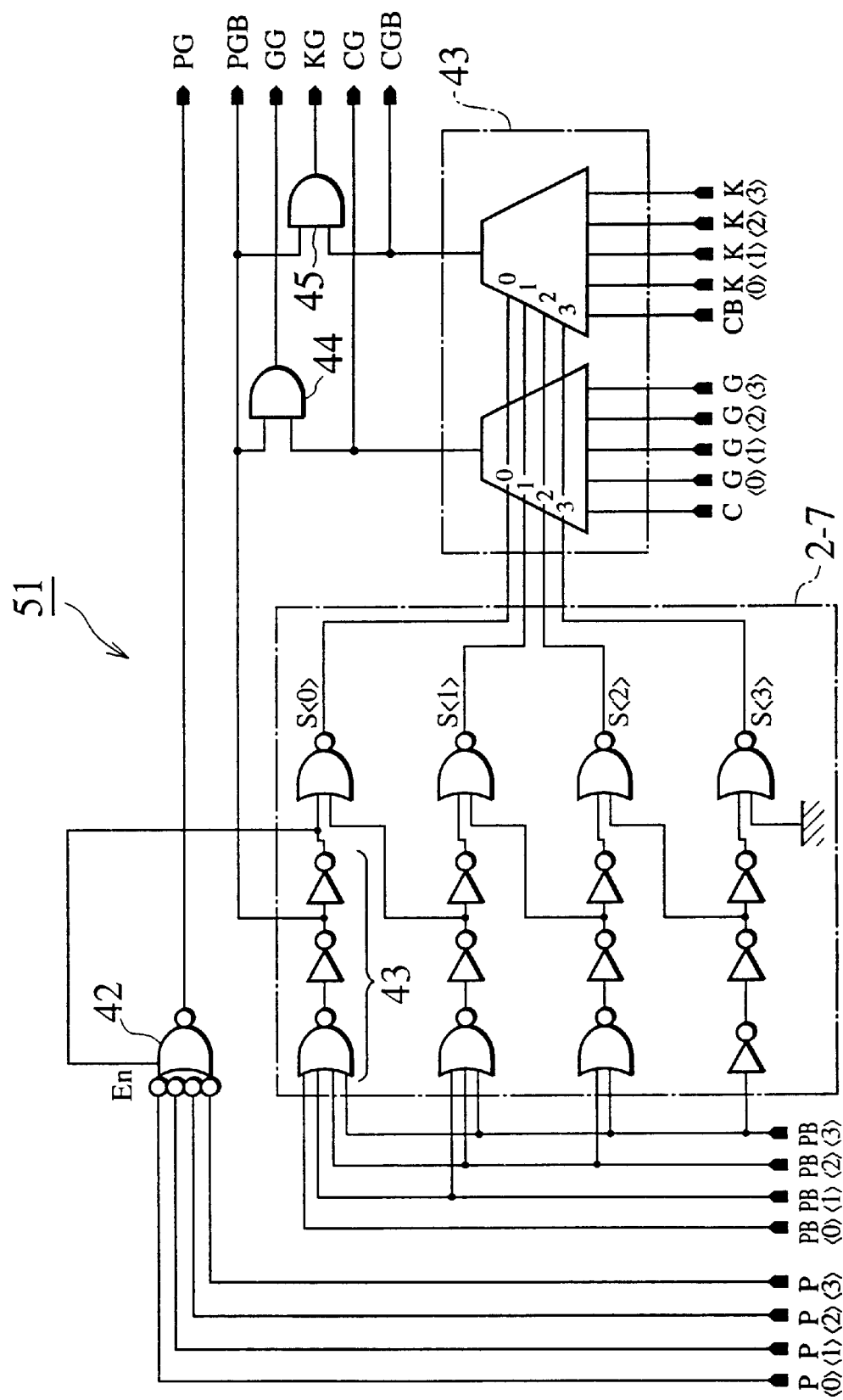
FIG. 23 is a circuit diagram showing a carry lookahead circuit in which the pseudo-NMOS NAND gate circuit 42 as illustrated in FIG. 17 is connected to the "1" bit searching circuit 2-7. The other constituent elements as illustrated in FIG. 24 have the equivalent structures and functions of the counterparts as illustrated in FIG. 17 and given the similar references.
Figure 24:
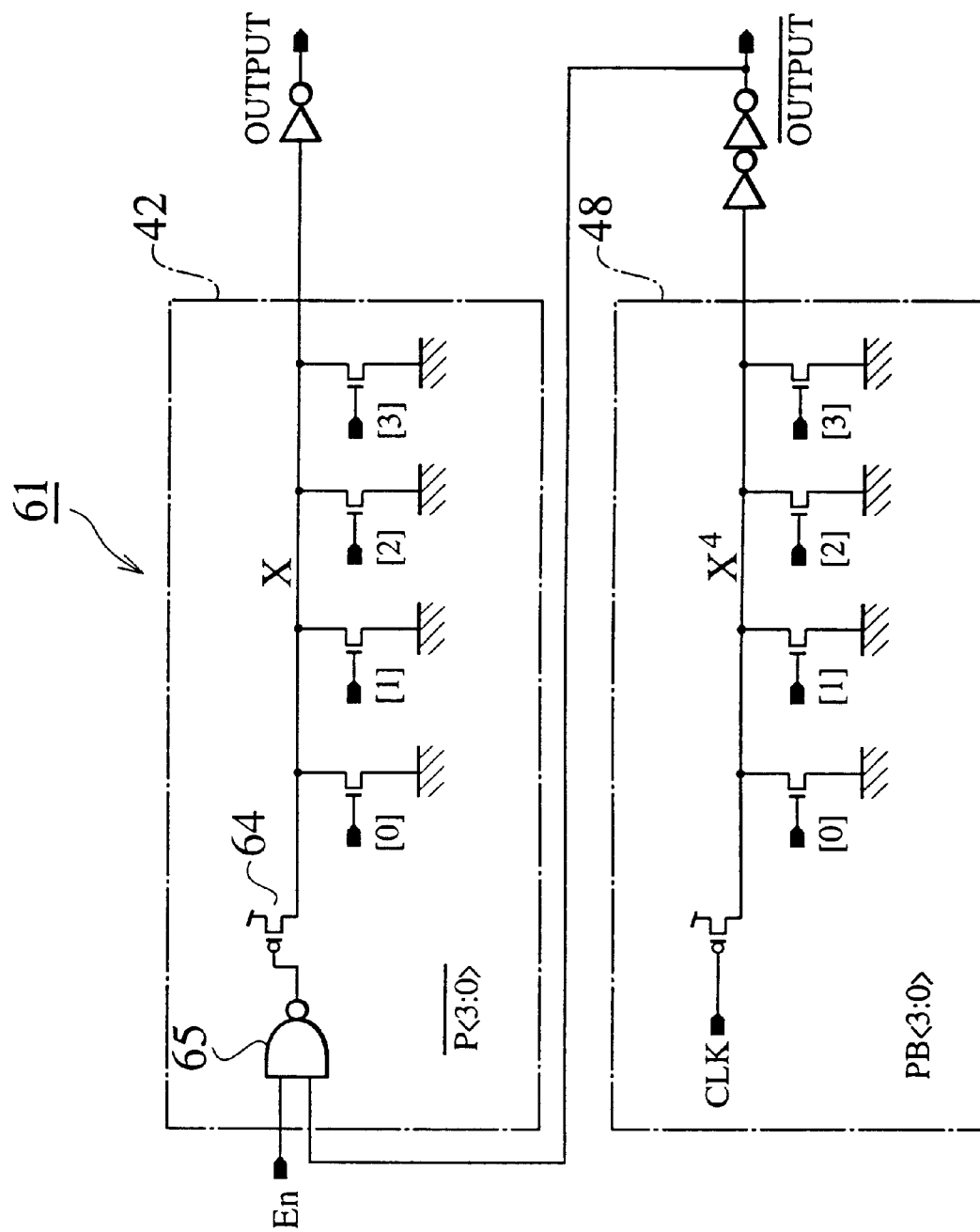
FIG. 24 is a circuit diagram showing the pseudo-NMOS NAND gate circuit 42 connected to a dynamic logic circuit 46 as part of the "1" bit searching circuit 2-7.

FIG. 23 is a circuit diagram showing a carry lookahead circuit in which the pseudo-NMOS NAND gate circuit 42 as illustrated in FIG. 17 is connected to the "1" bit searching circuit 2-7. The other constituent elements as illustrated in FIG. 24 have the equivalent structures and functions of the counterparts as illustrated in FIG. 17 and given the similar references. The pseudo-NMOS NAND gate circuit 42 is connected to a dynamic logic circuit 46 as part of the "1" bit searching circuit 2-7 as illustrated in FIG. 24. The pseudo-NMOS NAND gate circuit 42 and the dynamic logic circuit 46 have the same arrangement of constituent NMOS FETs. The pseudo-NMOS circuit 62 is composed of a plurality of NMOS FETs which are connected between the ground level and a signal line X in parallel under control of the inversion signal of the P signals of the respective bits of the group as given to the gate terminals of the NMOS FETs responsively, a PMOS gate circuit 47 connected to the signal line X in order to selectively connect the electric power source to the signal line X and an NAND gate circuit 48 connected to the PMOS gate circuit 47. On the other hand, the dynamic logic circuit 46 is composed of a plurality of NMOS FETs which are connected between the ground level and a signal line X* in parallel under control of the PB signals of the respective bits of the group as given to the gate terminals of the NMOS FETs responsively and a PMOS gate circuit 49 connected to the signal line X* in order to selectively connect the electric power source to the signal line X*.

Figure 25:
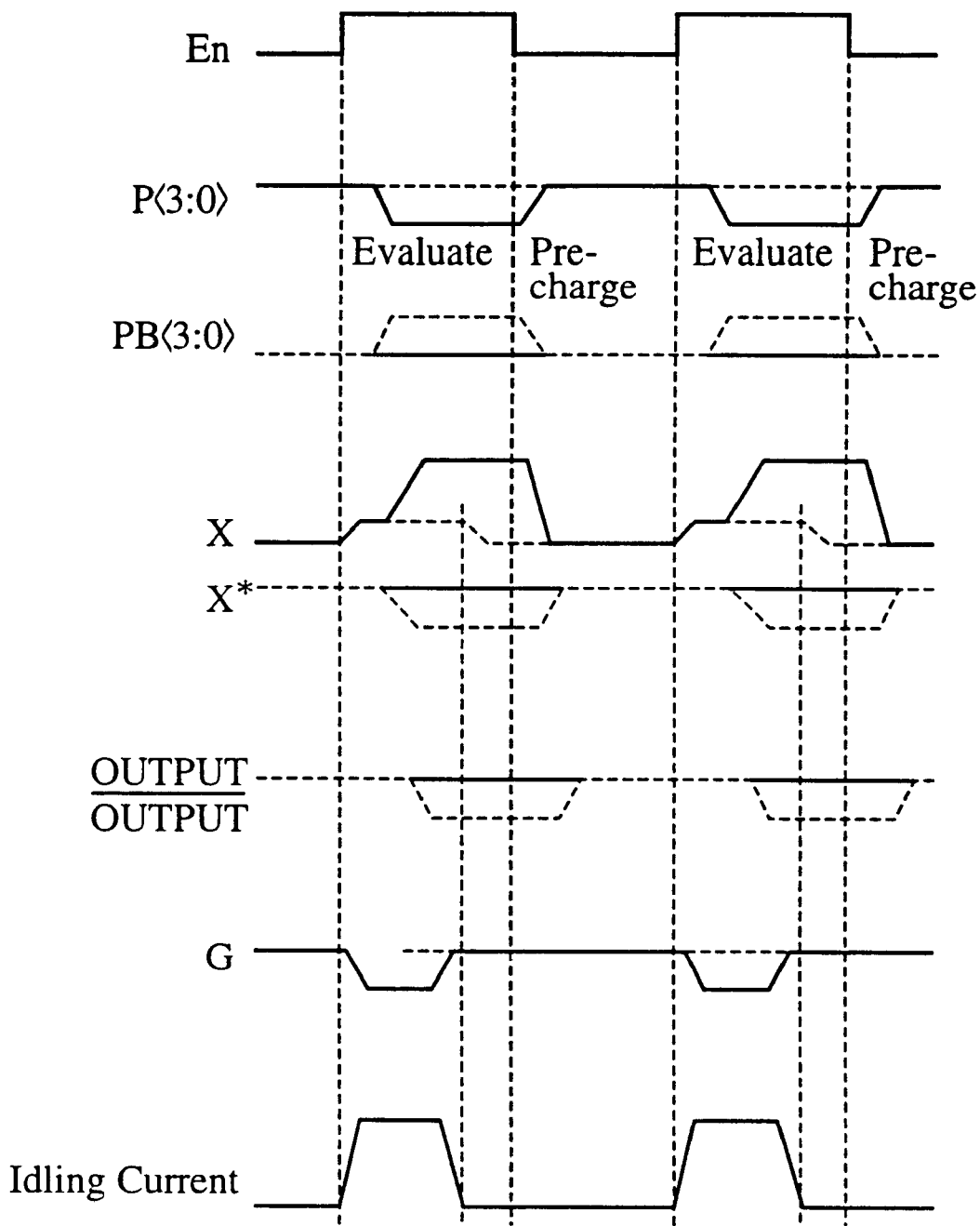
FIG. 25 shows timing chart of the circuit 42 as illustrated in FIG. 24.

FIG. 25 shows a timing chart for explaining the input/output operation of the pseudo-NMOS NAND gate circuit 42 as illustrated in FIG. 24.

The input signals to the pseudo-NMOS circuit 62 are pulled up to the "H" level during the precharge period (when the enable signal En is pulled down) in order to precharge the signal line X to the "L" level.

On the other hand, the input signals to the dynamic logic circuit 46 is pulled down to the "L" level during the precharge period (when the clock signal CLK is pulled down) in order to precharge the signal line X* to the "H" level. The P signals of the respective bits of the group, i.e., P<3:0> and the PB signals of the respective bits of the group, i.e., PB<3:0> are then given to the input signals to the pseudo-NMOS circuit 62 and the input signals to the dynamic logic circuit 46 during the evaluation period. Also, the enable signal En and the clock signal are pulled up during the evaluation period.

Since the output signal OUTPUT* of the dynamic logic circuit 46 (the inversion of OUTPUT) is precharged to the "H" level, the output of the control circuit 48 is a "1" so that the PMOS gate circuit 47 is turned on. All the input signals are then determinant during the next evaluation period. If the logic is not taken (i.e., the signal line X and the ground level are disconnected), the signal line X is maintained pulled up to the "H" level while there is no current as consumed therethrough. On the other hand, if the logic is taken (i.e., the signal line X and the ground level are connected), the signal line X is pulled down to the "L" level while there is a current as consumed through the PMOS gate circuit 47. However, in this case, the logic of the dynamic logic circuit 46 is also taken so that the signal line X* is pulled down to the "L" level and therefore the output signal OUTPUT* is also pulled down to the "L" level. The PMOS gate circuit 47 is then turned off by means of the control circuit 48 in order to prevent the undesirable idling current from flowing therethrough.

Figure 26:
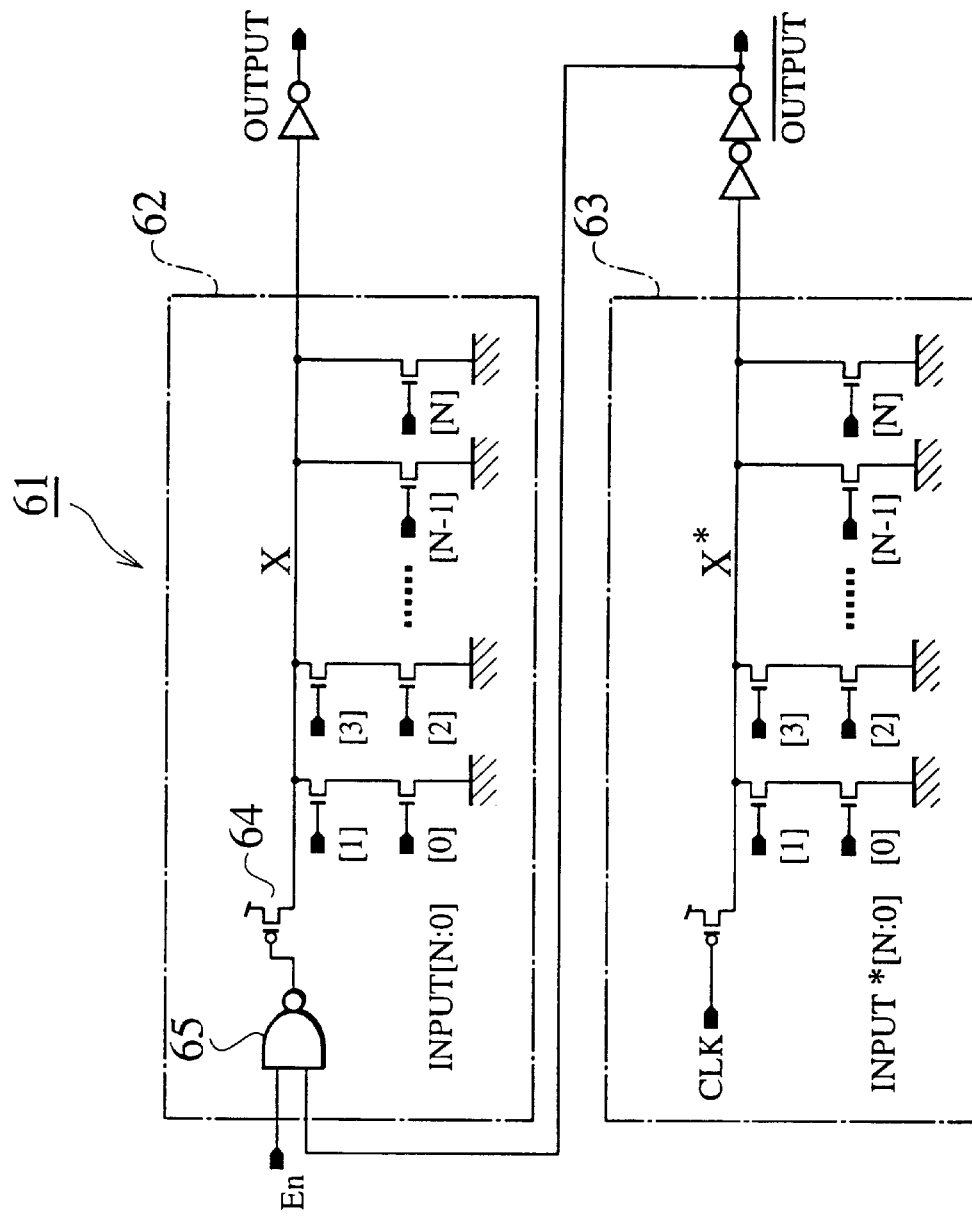
FIG. 26 is a circuit diagram showing the combination of such a dynamic logic circuit and a pseudo-NMOS circuit of which output signals are correlated with each other.

This configuration as illustrated in FIG. A can be applied generally to similar circuitry composed of a dynamic logic circuit and a pseudo-NMOS circuit of which output signals are correlated with each other. FIG. 26 is a circuit diagram showing the combination of such a dynamic logic circuit and a pseudo-NMOS circuit of which output signals are correlated with each other. The pseudo-NMOS NAND gate circuit 62 and the dynamic logic circuit 66 have the same arrangement of constituent NMOS FETs in this example. However, as long as the signal line X and the signal line X* take the same logic value during the evaluation period, it is not an indispensable condition that the pseudo-NMOS NAND gate circuit 62 and the dynamic logic circuit 66 have the same arrangement of constituent NMOS FETs. The pseudo-NMOS circuit 62 is composed of a plurality of NMOS FETs which are connected between the ground level and a signal line X in parallel under control of the inversion signal of the P signals of the respective bits of the group as given to the gate terminals of the NMOS FETs responsively, a PMOS gate circuit 47 connected to the signal line X in order to selectively connect the electric power source to the signal line X and an NAND gate circuit 48 connected to the PMOS gate circuit 47. On the other hand, the dynamic logic circuit 46 is composed of a plurality of NMOS FETs which are connected between the ground level and a signal line X* in parallel under control of the PB signals of the respective bits of the group as given to the gate terminals of the NMOS FETs responsively and a PMOS gate circuit 49 connected to the signal line X* in order to selectively connect the electric power source to the signal line X*.

Figure 27:
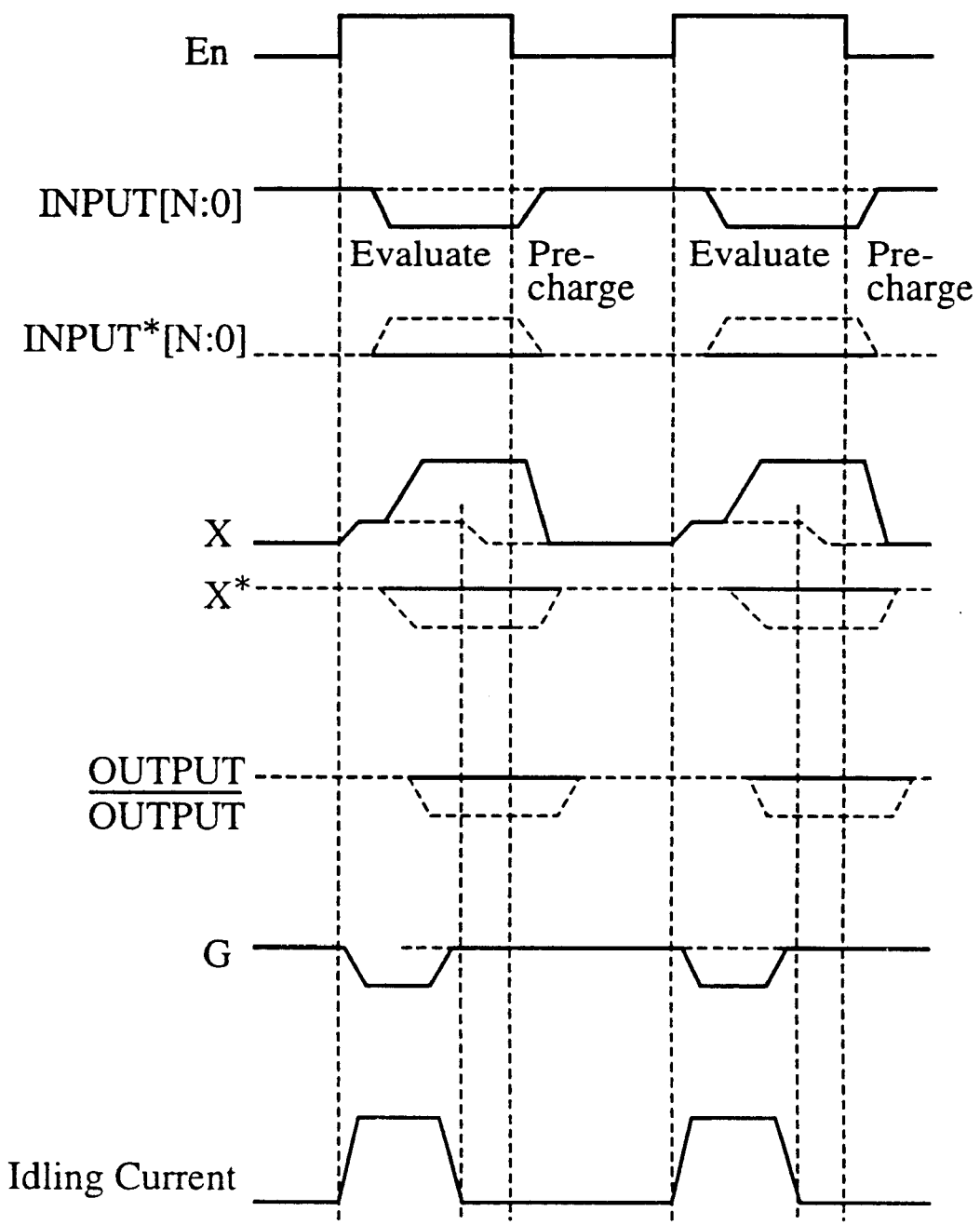
FIG. 27 shows a timing chart for explaining the input/output operation of the pseudo-NMOS NAND gate circuit 61 as illustrated in FIG. 26.

FIG. 27 shows a timing chart for explaining the input/output operation of the pseudo-NMOS NAND gate circuit 61 as illustrated in FIG. 26.

The signal INPUT[N:0] to be input to the pseudo-NMOS circuit 62 and the signal INPUT*[N:0] to be input to the dynamic logic circuit 63 take the same logic values during the evaluation period.

The input signals INPUT[N:0] to the pseudo-NMOS circuit 62 is pulled up to the "H" level during the precharge period (when the enable signal En is pulled down) in order to precharge the signal line X to the "L" level.

On the other hand, the input signals INPUT*[N:0] to the dynamic logic circuit 46 is pulled down to the "L" level during the precharge period (when the clock signal CLK is pulled down) in order to precharge the signal line X* to the "H" level. The logic signals to be evaluated are then given to the input signals to the pseudo-NMOS circuit 62 and the input signals to the dynamic logic circuit 46 during the evaluation period as INPUT[N:0] and INPUT*[N:0]. Also, the enable signal En and the clock signal are pulled up during the evaluation period.

Since the output signal OUTPUT* of the dynamic logic circuit 46 (the inversion of OUTPUT) is precharged to the "H" level, the output of the control circuit 48 is a "1" so that the PMOS gate circuit 47 is turned on. All the input signals are then determinant during the next evaluation period. If the logic is not taken (i.e., the signal line X and the ground level are disconnected), the signal line X is maintained pulled up to the "H" level while there is no current as consumed therethrough. On the other hand, if the logic is taken (i.e., the signal line X and the ground level are connected), the signal line X is pulled down to the "L" level while there is a current as consumed through the PMOS gate circuit 47. However, in this case, the logic of the dynamic logic circuit 46 is also taken so that the signal line X* is pulled down to the "L" level and therefore the output signal OUTPUT* is also pulled down to the "L" level. The PMOS gate circuit 47 is then turned off by means of the control circuit 48 in order to prevent the undesirable idling current from flowing therethrough.

Figure 28:
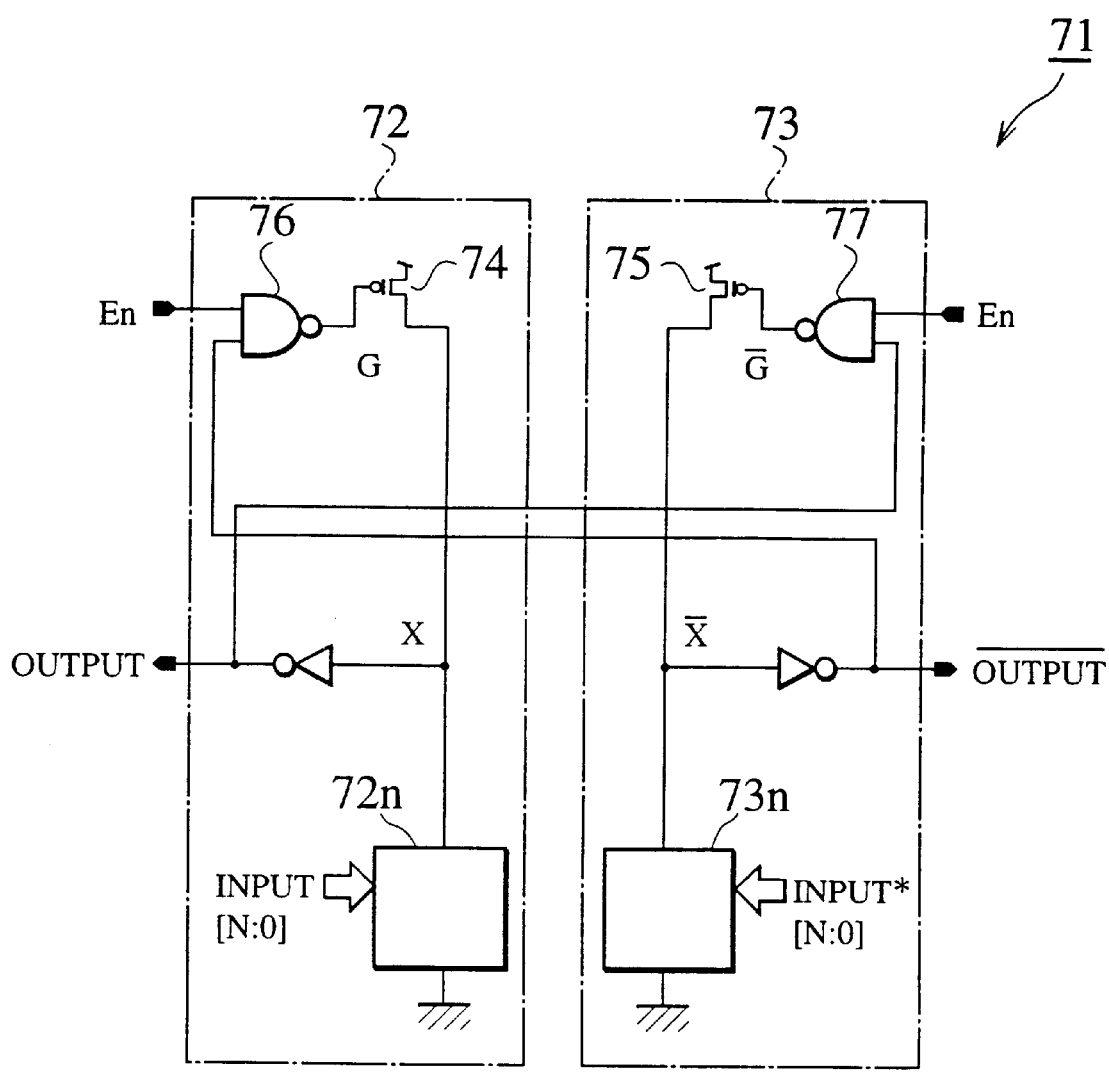
FIG. 28 is a circuit diagram showing an example of a complementary logic circuit in accordance with the present invention by making use of pseudo-NMOS NAND gate circuits.

FIG. 28 is a circuit diagram showing an example of a complementary logic circuit in accordance with the present invention by making use of pseudo-NMOS NAND gate circuits. The logic circuit 71 is composed of a first pseudo-NMOS circuit 72 and a second pseudo-NMOS circuit 73 whose output signal is complementary to the output of the first pseudo-NMOS circuit 72. The first pseudo-NMOS circuit 72 comprises a number of NMOS FETs combined to constitute a necessary logic as represented by a combinational logic circuit 72n and is supplied with the electric power source through the PMOS gate circuit 74 while the second pseudo-NMOS circuit 73 comprises a number of NMOS FETs combined to constitute a necessary logic as represented by a combinational logic circuit 73n and is supplied with the electric power source through the PMOS gate circuit 75. Furthermore, an NAND gate circuit 76 is provided for the first pseudo-NMOS circuit 72 to receive the output of the second pseudo-NMOS circuit 73 in order to selectively cut off the electric power supply to the first pseudo-NMOS circuit 72. Also, an NAND gate circuit 76 is provided for the second pseudo-NMOS circuit 73 to receive the output of the first pseudo-NMOS circuit 72 in order to selectively cut off the electric power supply to the second pseudo-NMOS circuit 73.

Figure 29:
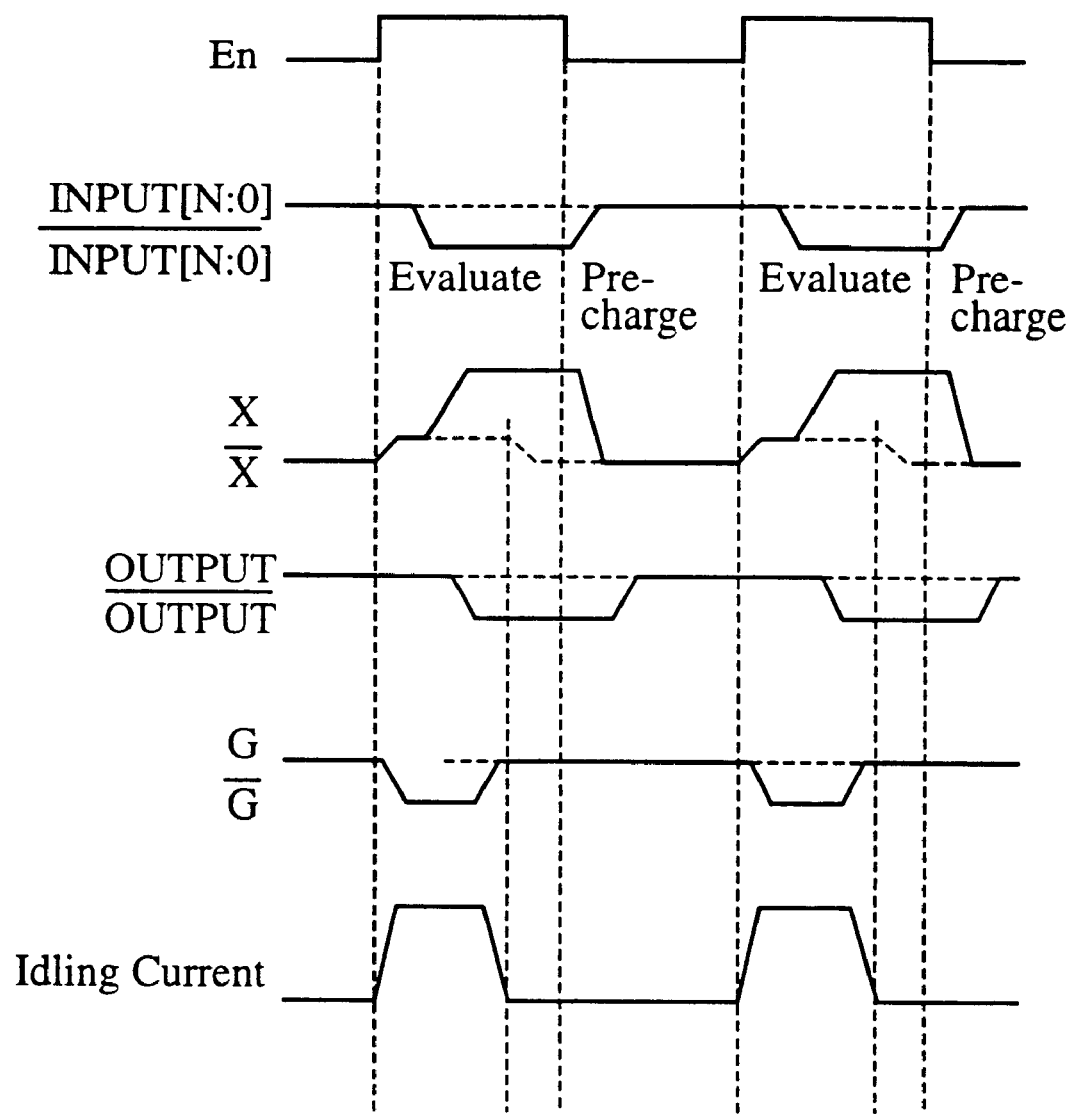
FIG. 29 shows a timing chart for explaining the input/output operation of the complementary pseudo-NMOS NAND gate circuits illustrated in FIG. 28.
Figure 30:
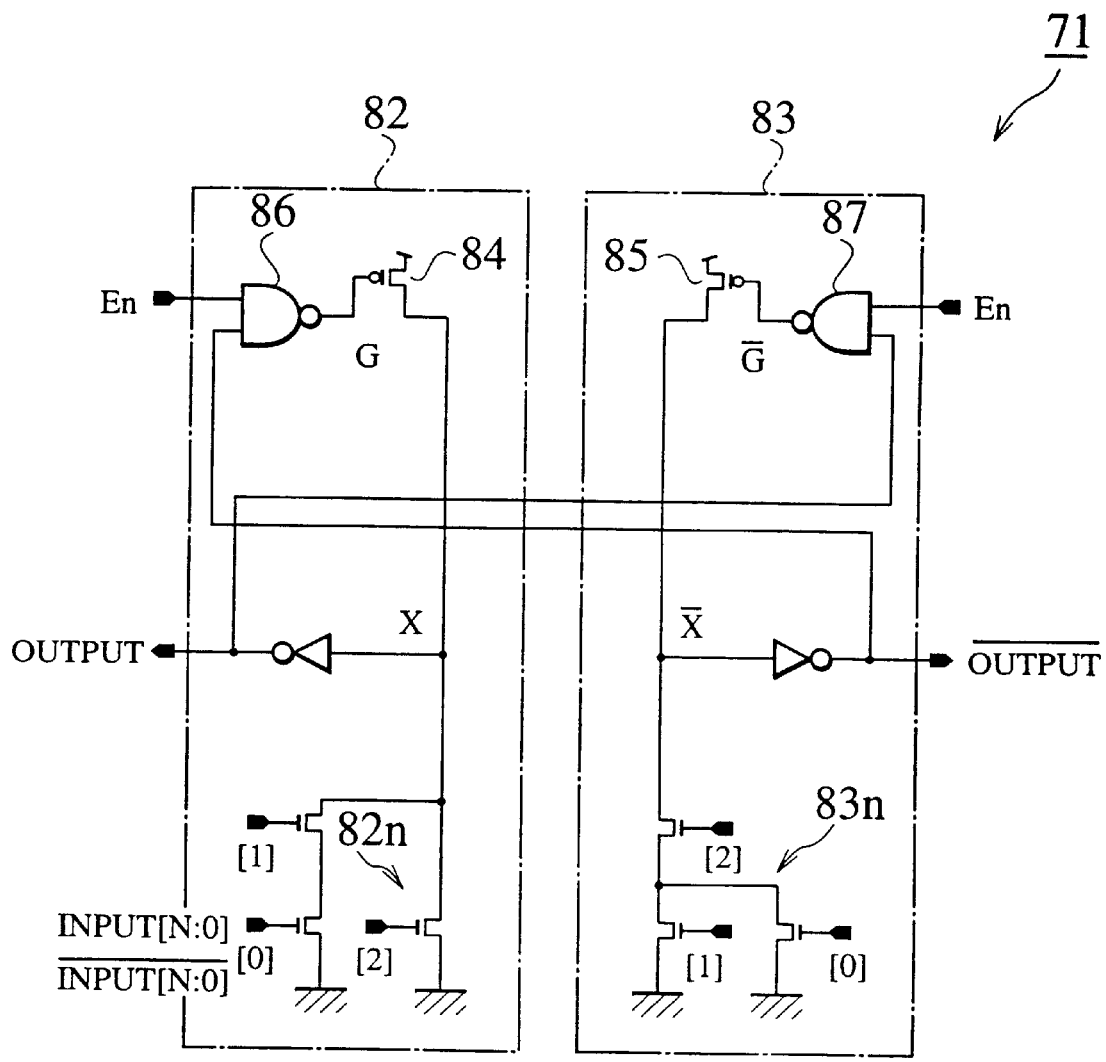
FIG. 30 is a circuit diagram showing an example of a complementary logic circuit in accordance with the present invention by making use of pseudo-NMOS NAND gate circuits as an application of the circuitry as illustrated in FIG. 28.

FIG. 29 shows a timing chart for explaining the input/output operation of the complementary pseudo-NMOS NAND gate circuits illustrated in FIG. 28.

The signal to be input to the pseudo-NMOS circuit 72 and the signal to be input to the second pseudo-NMOS circuit 73 as gate signals to the constituent NMOS FETs can take arbitrary logic values as long as the pseudo-NMOS circuit 72 and the signal to be input to the second pseudo-NMOS circuit 73 output the complementary logic values during the evaluation period. For example, the first pseudo-NMOS circuit 72 and the second pseudo-NMOS circuit 73 may given signal INPUT[N:0] and signal INPUT*[N:0] which take the complementary logic values during the evaluation period.

The input signals INPUT[N:0] to the pseudo-NMOS circuit 72 and the input signals INPUT*[N:0] to the second pseudo-NMOS circuit 73 are commonly pulled up to the "H" level during the precharge period (when the enable signal En is pulled down) in order to precharge the signal line X and the signal line X* respectively to the "L" level.

Since the output signal OUTPUT of the first pseudo-NMOS circuit 72 is precharged to the "H" level, the output of the NAND gate circuit 76 is a "1" so that the PMOS gate circuit 74 is turned on during the evaluation period.

Since the output signal OUTPUT* of the second pseudo-NMOS circuit 73 is precharged to the "H" level, the output of the NAND gate circuit 77 is a "1" so that the PMOS gate circuit 75 is turned on during the evaluation period when the enable signals En is activated. All the input signals are then determinant during the evaluation period. In this case, the logic of one of the combinational logic circuit 72n and the combinational logic circuit 73n is not taken (i.e., the signal line X (or X*) and the ground level are disconnected from the ground level) while the logic of the other of the combinational logic circuit 72n and the combinational logic circuit 73n is taken (i.e., the signal line X* (or X) and the ground level are connected from the ground level). Accordingly, since there is no current path serving to discharge the signal line X (or X*) of the combinational logic circuit being not taken, the signal line X (or X*) is maintained in the "H" level by means of the PMOS gate circuit 74 (or 75) resulting in no consumption current. On the other hand, since there is a current path serving to discharge the signal line X* (or X) of the combinational logic circuit being taken, the signal line X* (or X) is pulled down to the "L" level by means of the PMOS gate circuit 74 (or 75) resulting in a consumption current. However, since the output signal OUTPUT (or OUTPUT*) of the combinational logic circuit being not taken becomes low and serves to turn off the PMOS gate circuit 74 (or 75) through the pseudo-NMOS NAND gate circuit 76 (or 77) resulting in no further consumption current.

FIG. 29 is a circuit diagram showing an example of a complementary logic circuit in accordance with the present invention by making use of pseudo-NMOS NAND gate circuits as an application of the circuitry as illustrated in FIG. 28. The logic circuit 81 is composed of a first pseudo-NMOS circuit 82 and a second pseudo-NMOS circuit 83 whose output signal is complementary to the output of the first pseudo-NMOS circuit 82. The first pseudo-NMOS circuit 82 comprises a number of NMOS FETs combined to constitute a necessary logic as represented by a combinational logic circuit 82n and is supplied with the electric power source through the PMOS gate circuit 84 while the second pseudo-NMOS circuit 83 comprises a number of NMOS FETs combined to constitute a necessary logic as represented by a combinational logic circuit 83n and is supplied with the electric power source through the PMOS gate circuit 85. For example, the first pseudo-NMOS circuit 82 and the second pseudo-NMOS circuit 83 may given signal INPUT[N:0 ] and signal INPUT*[N:0] which take the complementary logic values during the evaluation period.

In this case, N is 2 and the following de Morgan logic are implemented by means of the NMOS FETs of the combinational logic circuit 82n and the combinational logic circuit 83n.

$$/(([0]*[1])+[2])=(/[0]+/[1])*/[2]$$

Furthermore, an NAND gate circuit 86 is provided for the first pseudo-NMOS circuit 82 to receive the output of the second pseudo-NMOS circuit 83 in order to selectively cut off the electric power supply to the first pseudo-NMOS circuit 82. Also, an NAND gate circuit 86 is provided for the second pseudo-NMOS circuit 83 to receive the output of the first pseudo-NMOS circuit 82 in order to selectively cut off the electric power supply to the second pseudo-NMOS circuit 83.

Figure 31:
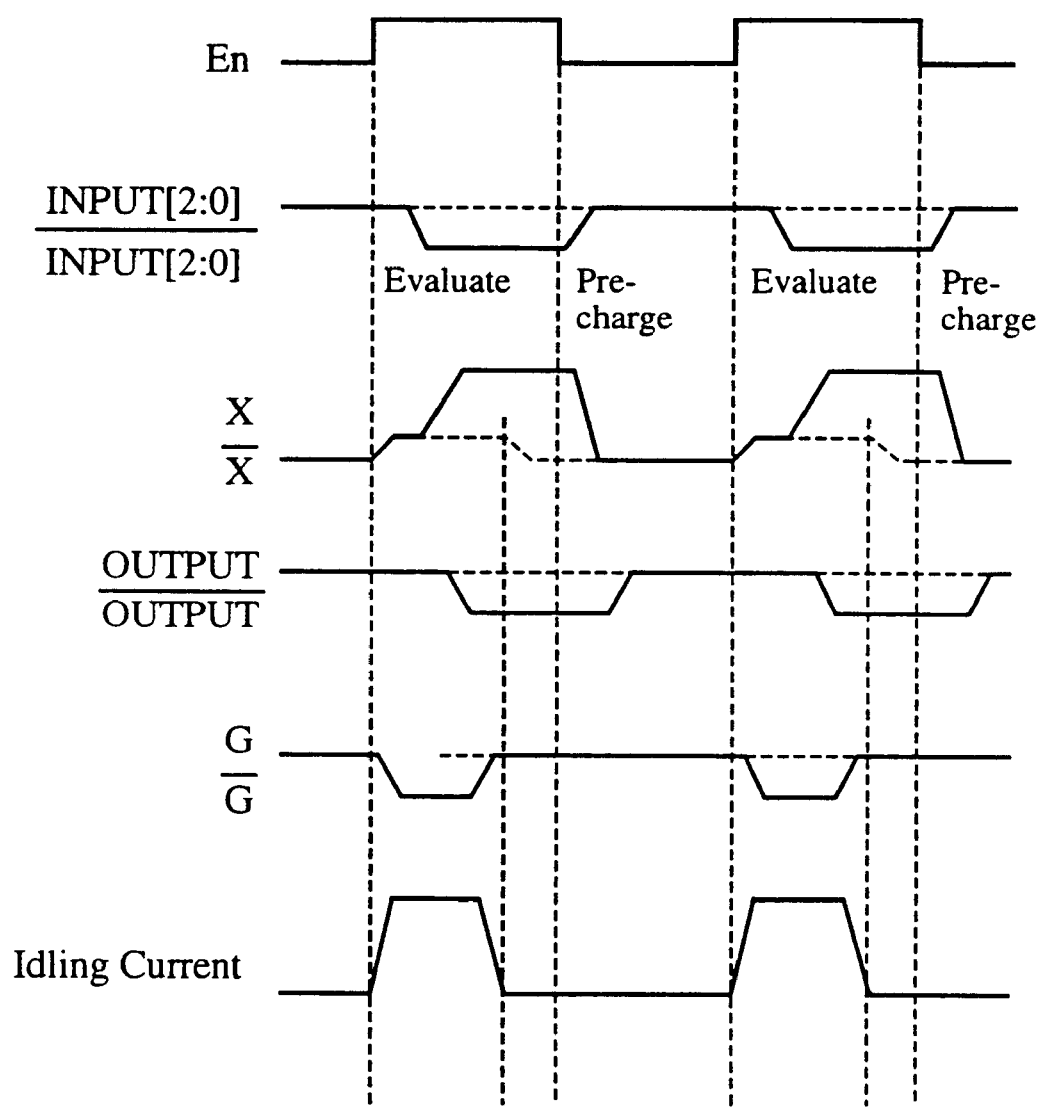
FIG. 31 shows a timing chart for explaining the input/output operation of the complementary pseudo-NMOS NAND gate circuits illustrated in FIG. 28.

FIG. 31 shows a timing chart for explaining the input/output operation of the complementary pseudo-NMOS NAND gate circuits illustrated in FIG. 28.

The signal to be input to the pseudo-NMOS circuit 82 and the signal to be input to the second pseudo-NMOS circuit 83 as gate signals to the constituent NMOS FETs can take arbitrary logic values as long as the pseudo-NMOS circuit 82 and the signal to be input to the second pseudo-NMOS circuit 83 output the complementary logic values during the evaluation period. For example, the first pseudo-NMOS circuit 82 and the second pseudo-NMOS circuit 83 may given signal INPUT[N:0] and signal INPUT*[N:0] which take the complementary logic values during the evaluation period.

The input signals INPUT[N:0] to the pseudo-NMOS circuit 82 and the input signals INPUT*[N:0] to the second pseudo-NMOS circuit 83 are commonly pulled up to the "H" level during the precharge period (when the enable signal En is pulled down) in order to precharge the signal line X and the signal line X* respectively to the "L" level.

Since the output signal OUTPUT of the first pseudo-NMOS circuit 82 is precharged to the "H" level, the output of the NAND gate circuit 86 is a "1" so that the PMOS gate circuit 84 is turned on during the evaluation period.

Since the output signal OUTPUT* of the second pseudo-NMOS circuit 83 is precharged to the "H" level, the output of the NAND gate circuit 87 is a "1" so that the PMOS gate circuit 85 is turned on during the evaluation period when the enable signals En is activated. All the input signals are then determinant during the evaluation period. In this case, the logic of one of the combinational logic circuit 82$n$ and the combinational logic circuit 83$n$ is not taken (i.e., the signal line X (or X*) and the ground level are disconnected from the ground level) while the logic of the other of the combinational logic circuit 82$n$ and the combinational logic circuit 83$n$ is taken (i.e., the signal line X* (or X) and the ground level are connected from the ground level). Accordingly, since there is no current path serving to discharge the signal line X (or X*) of the combinational logic circuit being not taken, the signal line X (or X*) is maintained in the "H" level by means of the PMOS gate circuit 84 (or 85) resulting in no consumption current. On the other hand, since there is a current path serving to discharge the signal line X* (or X) of the combinational logic circuit being taken, the signal line X* (or X) is pulled down to the "L" level by means of the PMOS gate circuit 84 (or 85) resulting in a consumption current. However, since the output signal OUTPUT (or OUTPUT*) of the combinational logic circuit being not taken becomes low and serves to turn off the PMOS gate circuit 84 (or 85) through the pseudo-NMOS NAND gate circuit 86 (or 87) resulting in no further consumption current.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A logic circuit comprising:

a dynamic logic circuit composed of a first combinational logic circuit connected between an output line and a ground level, said output line of said dynamic logic circuit being pulled up to a "H" level during the precharge period, while said output line is disconnected from said ground level and an electric power source is supplied to said output line, by controlling input signals to the first combinational logic circuit;

said first combinational logic circuit being given input signals to be evaluated during an evaluation period while said output line is disconnected from said electric power source so that said dynamic logic circuit serves to output a logic value corresponding to an logic operation by the use of the input signals;

a pseudo-NMOS circuit composed of a second combinational logic circuit connected between an output line and a ground level, said output line of said pseudo-NMOS circuit being pulled down to a "L" level during the precharge period, while said output line is connected to said ground level, by controlling input signals to the first combinational logic circuit;

said second combinational logic circuit being given input signals to be evaluated while an electric power source is supplied to said output line during an evaluation period so that said pseudo-NMOS circuit serves to output a logic value corresponding to an logic operation by the use of the input signals by selectively disconnecting said output line from said ground level; and a logic gate connected to said dynamic logic circuit and serving to control the supply of the electric power source to said output line of said pseudo-NMOS circuit in accordance with the signal of said output line of said dynamic logic circuit, wherein said dynamic logic circuit and said pseudo-NMOS circuit are complementary and wherein said logic gate serves to cut off the supply of the electric power source to said output line of said pseudo-NMOS circuit, when said output line of said pseudo-NMOS circuit and said ground level are connected during the evaluation period to pull down said output line to the "L" level, in response to the corresponding change of said output line of said dynamic logic circuit.

2. The logic circuit as claimed in claim 1 wherein said first combinational logic circuit and said second combinational logic circuit have the same arrangement of constituent NMOS FETs.

3. Pseudo-NMOS logic circuit comprising:

a first pseudo-NMOS circuit composed of a first combinational logic circuit connected between an output line and a ground level, said output line of said pseudo-NMOS circuit being pulled down to a "L" level during the precharge period, while said output line is connected to said ground level, by controlling input signals to the first combinational logic circuit;

said first combinational logic circuit being given input signals to be evaluated while an electric power source is supplied to said output line during an evaluation period so that said first pseudo-NMOS circuit serves to output a logic value corresponding to an logic operation by the use of the input signals by selectively disconnecting said output line from said ground level; and a second pseudo-NMOS circuit composed of a second combinational logic circuit connected between an output line and a ground level, said output line of said pseudo-NMOS circuit being pulled down to a "L" level during the precharge period, while said output line is connected to said ground level, by controlling input signals to the second combinational logic circuit;

said second combinational logic circuit being given input signals to be evaluated while an electric power source is supplied to said output line during an evaluation period so that said second pseudo-NMOS circuit serves to output a logic value corresponding to an logic operation by the use of the input signals by selectively disconnecting said output line from said ground level; and a first logic gate connected to said second pseudo-NMOS circuit and serving to control the supply of the electric power source to said output line of said first pseudo-NMOS circuit in accordance with the signal of said output line of said second pseudo-NMOS logic circuit, a second logic gate connected to said first pseudo-NMOS circuit and serving to control the supply of the electric power source to said output line of said second pseudo-NMOS circuit in accordance with the signal of said output line of said first pseudo-NMOS logic circuit, wherein said first pseudo-NMOS logic circuit and said second pseudo-NMOS logic circuit are complementary and wherein one of said first logic gate and said second logic gate serves to cut off the supply of the electric power source to said output line of one of said first pseudo-NMOS circuit and said second pseudo-NMOS circuit during the evaluation period in response to the corresponding change of said output line of the other of said first pseudo-NMOS circuit and said second pseudo-NMOS circuit to a "H" level.

* * * * *